US 6,744,568 B2

(12) United States Patent
Kitamura et al.

(10) Patent No.: US 6,744,568 B2
(45) Date of Patent: Jun. 1, 2004

(54) OBJECTIVE LENS, METHOD FOR CORRECTING MANUFACTURING ERROR THEREOF, AND OPTICAL PICK-UP DEVICE USING THE SAME

(75) Inventors: Kazuya Kitamura, Tenri (JP); Yukio Kurata, Tenri (JP); Takeshi Yamaguchi, Sakai (JP); Tetsuo Iwaki, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/117,352

(22) Filed: Apr. 8, 2002

(65) Prior Publication Data

US 2003/0026006 A1 Feb. 6, 2003

(30) Foreign Application Priority Data

Apr. 6, 2001 (JP) ........................................ 2001-109326

(51) Int. Cl.[7] .............................. G02B 3/02; G11B 7/00
(52) U.S. Cl. .................... 359/719; 359/718; 369/112.23
(58) Field of Search ................................ 359/661, 718, 359/719; 369/112.23, 112.1

(56) References Cited

U.S. PATENT DOCUMENTS 5,986,779 A * 11/1999 Tanaka et al. ................ 359/19
6,411,442 B1 * 6/2002 Ota et al. .................... 359/642
6,512,640 B2 * 1/2003 Ota et al. .................... 359/719

FOREIGN PATENT DOCUMENTS

JP 9-311271 A 12/1997
JP 10-123410 A 5/1998

* cited by examiner

Primary Examiner—Georgia Epps
Assistant Examiner—William Choi
(74) Attorney, Agent, or Firm—Nixon & Vanderhye PC

(57) ABSTRACT

An objective lens is a single-lens objective lens both surfaces of which are aspherical. The objective lens has a numerical aperture not less than 0.75, and is made of glass satisfying 1.75<n, and 35<ν, where n is a refractive index of the glass for at least one of used wavelengths, and ν is an Abbe number for a d-lay. With this arrangement, it becomes possible to provide an objective lens which is downsized, has less aberration, and corrects the aberration easily, without a decline in light utilization efficiency; a method for correcting a manufacturing error thereof; and an optical pick-up device using the objective lens.

24 Claims, 31 Drawing Sheets

FIG. 6 (a)
FIG. 6 (b)
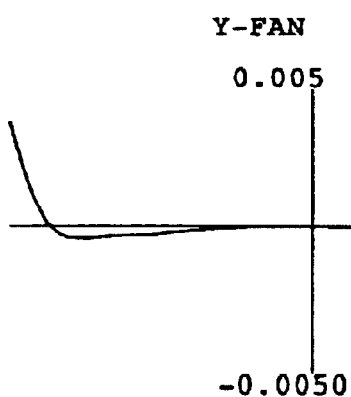
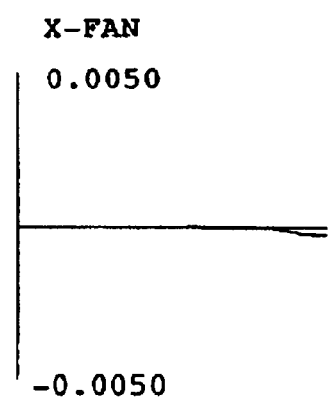
FIG. 7(a)
FIG. 7 (b)
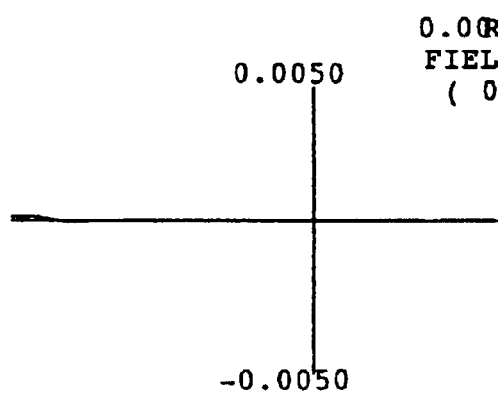
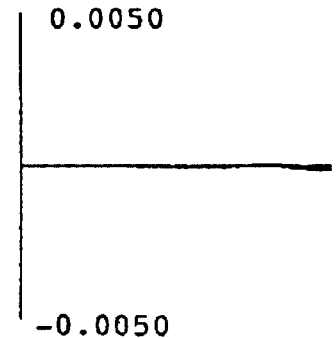

FIG. 15 (a)
FIG. 15 (b)
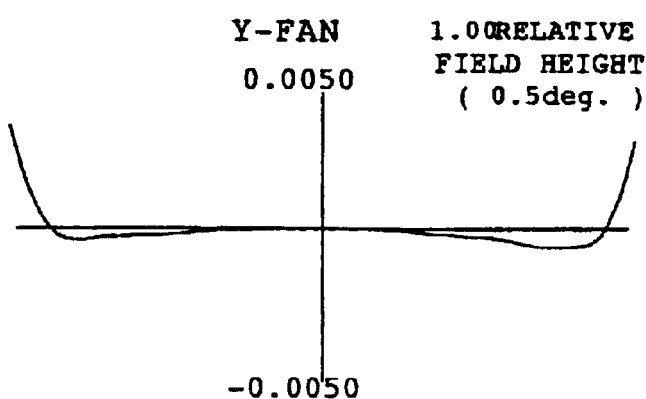
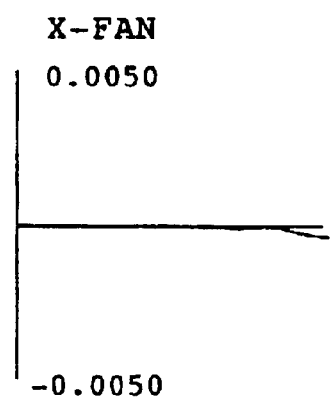
FIG. 16 (a)
FIG. 16 (b)
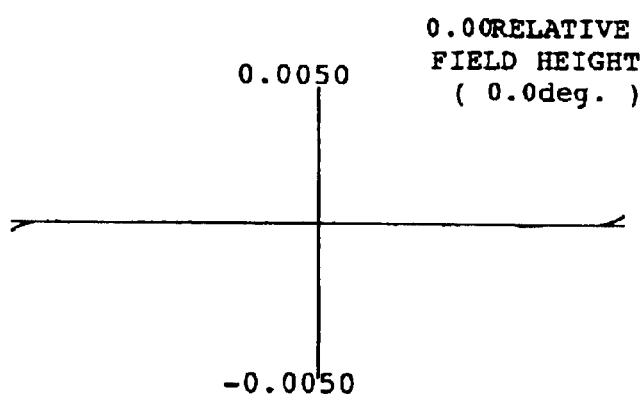
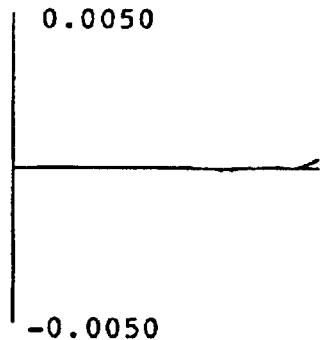

Y-FAN 1.0 RELATIVE FIELD HEIGHT ( 0.5deg. )
0.0050
-0.0050

X-FAN
0.0050
-0.0050

0.0 RELATIVE FIELD HEIGHT ( 0.0deg. )
0.0050
-0.0050

0.0050
-0.0050

LONGITUDINAL
SPHERICAL ABER.

FIG. 30(a)　　　　　　　　FIG. 30(b)
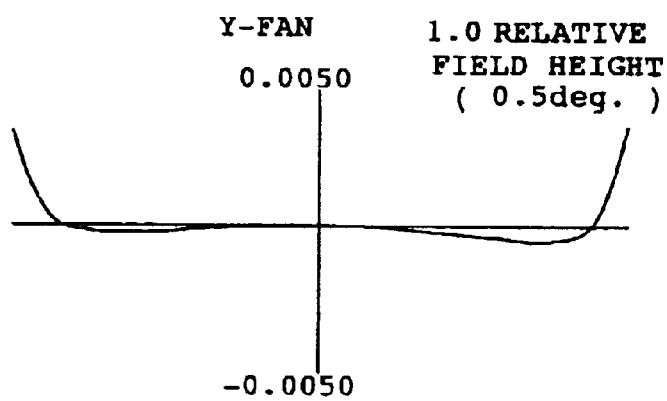
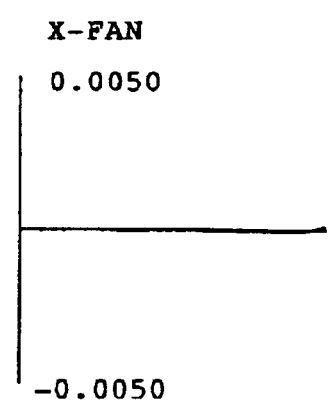
FIG. 31(a)　　　　　　　　FIG. 31(b)
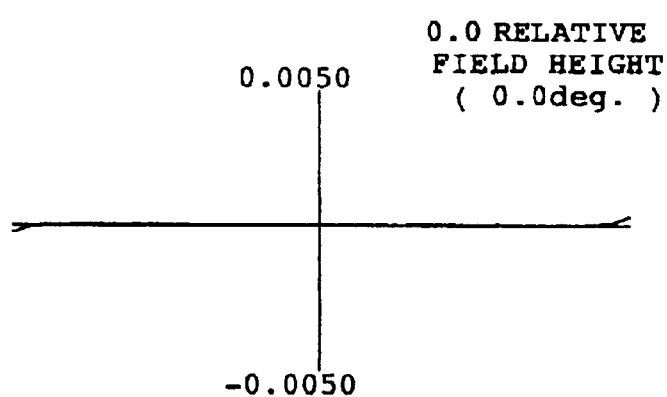
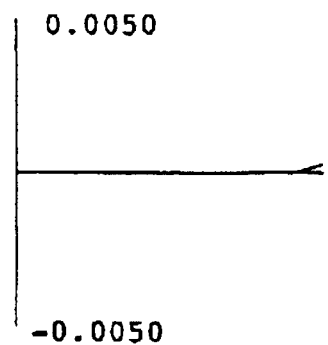

OBJECTIVE LENS, METHOD FOR CORRECTING MANUFACTURING ERROR THEREOF, AND OPTICAL PICK-UP DEVICE USING THE SAME

FIELD OF THE INVENTION

The present invention relates to an objective lens for recording or reproducing information on or from an optical information recording medium, in particular, an objective lens with less aberration, a method for correcting a manufacturing error thereof, and an optical pick-up device using the objective lens.

BACKGROUND OF THE INVENTION

Light-utilizing technology has various characteristics such as high speed owing to high frequency, and capability of spacial information processing, phase processing, etc. Therefore, such technology has been under research and development, and used in practical applications in a variety of fields including communication, instrumentation, processing, and the like.

In the light-utilizing technology, a high-precision objective lens has been used as means for focusing an optical beam which is emitted from a light source and irradiated onto a recording medium. In recent years, the demand for an image recording device, etc. utilizing light has been especially increasing, and technology for realizing mass-storage recording is of increasing importance.

In order to record mass optical information, it is necessary to improve recording media so as to achieve high recording density, and what is more, to form a smaller beam spot, that is, to focus a beam spot sufficiently by an objective lens. In this manner, more information can be recorded by forming a smaller beam spot.

Besides, the diameter of a beam spot is proportional to the wavelength of light emitted from a light source to be used, and inversely proportional to the NA (Numerical Aperture) of an objective lens. Consequently, in order to form a smaller beam spot, it is necessary to shorten the wavelength of the light emitted from a light source to be used, or to increase the NA of the objective lens so as to obtain a higher NA.

As for the wavelength of light, a blue laser diode and a blue or green SHG (Second Harmonic Generation) laser are being developed, and shorter wavelength is being realized.

Meanwhile, as for the NAs of objective lenses, for example, the NA of a CD (Compact Disc) is 0.45, and the NA of a DVD (Digital Versatile Disc) is 0.6. In this manner, the DVD, having a higher NA than the CD, has achieved higher density of information to be recorded.

Besides, an optical pick-up device which uses a 2-group lens (a pair of lenses) so as to realize an objective lens having a further higher NA is disclosed in Japanese Unexamined Patent Publication No. 10-123410 (Tokukaihei 10-123410, published on May 15, 1998). In this optical pick-up device, an objective lens is made up of a 2-group lens in which a pair of lenses are combined using a lens barrel or the like. With this arrangement, the NA of the objective lens can be set at 0.85, achieving a higher NA.

However, when combining these two lenses in the above arrangement, an interval between the lenses, positioning of these lenses should be carried out accurately considering tilts of the respective lenses with respect to an optical axis, and a deviation of centers of the lenses, etc. Therefore, at the time of positioning, it is necessary to adjust the positions of the lenses while actually emitting a laser beam and checking the focusing condition of a beam spot and an aberration actually caused. Consequently, the positioning process is complicated.

In addition, resin is required to fix the 2-group lens. However, resin does not have sufficient heat and moisture resistance properties, and changes over time. In this manner, resin may have characteristic changes, and thus has low reliability.

Further, the 2-group lens weighs heavier as it includes the lens barrel, etc. Generally, focus control and tracking control are carried out by an actuator, by moving an objective lens in a direction parallel or vertical to the optical axis. Here, if the objective lens is heavy in weight, the objective lens cannot be driven at a high speed, making the information recording/reproducing speed slow.

On the other hand, an optical pick-up device using a single lens as an objective lens so as to achieve a higher NA is disclosed in Japanese Unexamined Patent Publication No. 9-311271 (Tokukaihei 9-311271, published on Dec. 2, 1997). As shown in FIG. 37, the optical pick-up device includes an objective lens in which a diffraction lens 103 and an aspherical lens 102 are integrated, a convex skew plate 104, and a concave skew plate 105.

In the foregoing optical pick-up device, a laser beam emitted from a light source is irradiated via the objective lens onto a disk 101, and thus information is recorded and reproduced on and from the disk 101.

With this structure, a chromatic aberration can be corrected by using the objective lens in which the diffraction lens 103 and the aspherical lens 102 are integrated. Besides, a comatic aberration can be corrected by moving the convex skew plate 104 and the concave skew plate 105 respectively in opposite directions.

In this manner, since a single lens is used as the objective lens of the optical pick-up device shown in FIG. 37, positioning process, resin for fixing lenses, etc. are not required.

However, the objective lens shown in FIG. 37 is made up by integrating the diffraction lens 103 and the aspherical lens 102. Therefore, when diffraction efficiency is reduced due to an error caused in a process for manufacturing the objective lens, lens transmittance of a laser beam (light) is decreased, resulting in a decline in light utilization efficiency.

Besides, since the interval of a diffraction grating of the diffraction lens 103 is very narrow, it is difficult to manufacture the diffraction lens 103. Using such a diffraction lens 103 involves an increase in manufacturing cost and characteristic changes depending on a polarization direction. Consequently, it is difficult to further downsize the objective lens provided with the diffraction lens 103.

SUMMARY OF THE INVENTION

It is therefore an object of the present invention to provide an objective lens which is downsized, has less aberration, and can correct the aberration easily, without a decline in light utilization efficiency; a method for correcting a manufacturing error thereof; and an optical pick-up device using the objective lens.

To achieve the foregoing object, an objective lens of the present invention is an objective lens having a numerical aperture not less than 0.75, and the objective lens is structured such that it is a single-lens objective lens both surfaces of which are aspherical, and is made of a material satisfying:

$$1.75 < n, \text{ and } 35 < v,$$

where n is refractive index for at least one of used wavelengths, and v is an Abbe number for a d-line.

According to the foregoing structure, a single-lens objective lens is used as the objective lens, and, for example, a diffraction element, etc. are not required. Therefore, efficiency to utilize light (laser beam) passing through the objective lens can be improved. In addition, manufacture of the objective lens can be facilitated, and further, miniaturization of the objective lens can be realized.

Besides, since the numerical aperture NA of the objective lens is not less than 0.75, for example, it becomes possible to form a smaller beam spot incident on a recording medium, realizing higher recording density in the recording medium.

Generally, a chromatic aberration is caused since the refractive index of a material constituting the objective lens varies depending on the wavelength of light. Due to the chromatic aberration, the position or the size of an image differs depending on the wavelength.

However, by setting as 35<v, the chromatic aberration can be lessened, and such an arrangement can prevent the phenomenon that an image point is shifted and a beam spot is out of focus due to a slight change in the wavelength.

Besides, by setting as 1.75<n, the curvature of a first surface of the objective lens can be reduced, facilitating the manufacture of the objective lens.

An optical pick-up device of the present invention is structured so as to include:

a light source; and an objective lens having a numerical aperture not less than 0.75, the objective lens being made of a material satisfying:

1.75<n, and 35<v, where n is a refractive index for at least one of used wavelengths, and v is an Abbe number for a d-line.

the objective lens being a single-lens objective lens both surfaces of which are aspherical, wherein information is recorded or reproduced on or from a recording medium by irradiating light emitted from the light source onto the recording medium using the objective lens.

The foregoing structure can provide an optical pick-up device which has less chromatic aberration and spherical aberration, and can accurately condense a laser beam onto the recording medium, without a decline in the efficiency to utilize light (laser beam) passing through the objective lens.

A method for correcting a manufacturing error of an objective lens of the present invention includes the step of correcting a manufacturing error caused when manufacturing an objective lens having a numerical aperture not less than 0.75, the objective lens being made of a material satisfying:

1.75<n, and 35<v, where n is a refractive index for at least one of used wavelengths, and v is an Abbe number for a d-line.

the objective lens being a single-lens objective lens both surfaces of which are aspherical, by adjusting a tilt of the objective lens with respect to an optical pick-up device, the optical pick-up device structured so as to include a light source and the objective lens, for recording or reproducing information on or from a recording medium by irradiating light emitted from the light source onto the recording medium using the objective lens.

Generally, when manufacturing an objective lens, considering the accuracy for positioning a mold at the time of molding, the accuracies of the weight and the volume of the preform, which is a material for the objective lens, the accuracy of processing the mold, etc., manufacturing errors such as the tilts of both surfaces of the objective lens, and a deviation of the centers of the both surfaces of the objective lens are caused. A comatic aberration is caused due to such manufacturing errors.

However, according to the foregoing structure, the comatic aberration caused by the manufacturing errors can be corrected by adjusting the tilt of the objective lens with respect to the optical pick-up device. Consequently, the aberration can be lessened, and the aberration can be easily corrected.

A method for correcting a manufacturing error of an objective lens of the present invention includes the step of correcting a manufacturing error caused when manufacturing an objective lens having a numerical aperture not less than 0.75, the objective lens being made of a material satisfying:

1.75<n, and 35<v, where n is a refractive index for at least one of used wavelengths, and v is an Abbe number for a d-line.

the objective lens being a single-lens objective lens both surfaces of which are aspherical, by adjusting a tilt of a recording medium with respect to an optical pick-up device, the optical pick-up device comprising a light source and the objective lens, for recording or reproducing information on or from the recording medium by irradiating light emitted from the light source onto the recording medium using the objective lens.

According to the foregoing structure, the comatic aberration caused by the manufacturing error can be corrected by adjusting the tilt of the recording medium with respect to the optical pick-up device. Consequently, the aberration can be lessened, and the aberration can be easily corrected.

For a fuller understanding of the nature and advantages of the invention, reference should be made to the ensuing detailed description taken in conjunction with the accompanying drawings.

BRIEF DESCRIPTION OF THE DRAWINGS

FIG. 6($a$) is a graph showing a lateral aberration in a Y-axis direction when an incident angle of a laser beam to the objective lens shown in FIG. 3 is 0.5°, and FIG. 6($b$) is a graph showing a lateral aberration in an X-axis direction when an incident angle of a laser beam to the objective lens shown in FIG. 3 is 0.5°.

FIG. 7($a$) is a graph showing a lateral aberration in a Y-axis direction when an incident angle of a laser beam to the objective lens shown in FIG. 3 is 0°, and FIG. 7(b) is a graph showing a lateral aberration in an X-axis direction when an incident angle of a laser beam to the objective lens shown in FIG. 3 is 0°.

FIG. 15(a) is a graph showing a lateral aberration in a Y-axis direction when an incident angle of a laser beam to the objective lens shown in FIG. 12 is 0.5°, and FIG. 15(b) is a graph showing a lateral aberration in an X-axis direction when an incident angle of a laser beam to the objective lens shown in FIG. 12 is 0.5°.

FIG. 16(a) is a graph showing a lateral aberration in a Y-axis direction when an incident angle of a laser beam to the objective lens shown in FIG. 12 is 0°, and FIG. 16(b) is a graph showing a lateral aberration in an X-axis direction when an incident angle of a laser beam to the objective lens shown in FIG. 12 is 0°.

FIG. 30(a) is a graph showing a lateral aberration in a Y-axis direction when an incident angle of a laser beam to the objective lens shown in FIG. 27 is 0.5°, and FIG. 30(b) is a graph showing a lateral aberration in an X-axis direction when an incident angle of a laser beam to the objective lens shown in FIG. 27 is 0.5°.

FIG. 31(a) is a graph showing a lateral aberration in a Y-axis direction when an incident angle of a laser beam to the objective lens shown in FIG. 27 is 0°, and FIG. 31(b) is a graph showing a lateral aberration in an X-axis direction when an incident angle of a laser beam to the objective lens shown in FIG. 27 is 0°.

FIG. 36(b) is a graph showing a lateral aberration in an X-axis direction when an incident angle of a laser beam to the objective lens shown in FIG. 32 is 0°.

DESCRIPTION OF THE PREFERRED EMBODIMENTS

Referring to FIGS. 1 through 36(b), the following description will explain one embodiment of the present invention.

Figure 1:
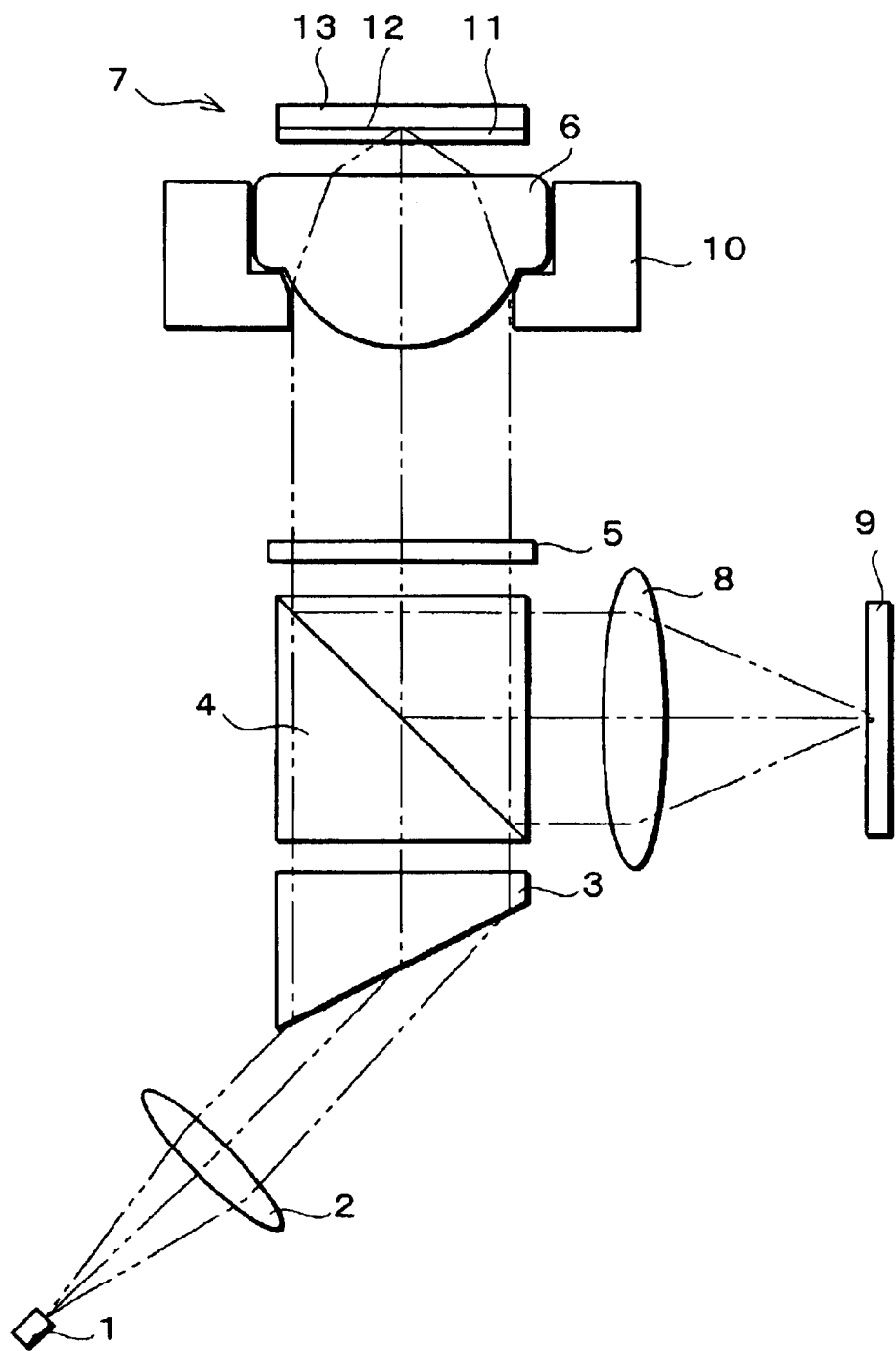
FIG. 1 is an explanatory view showing a schematic structure of an optical pick-up device in accordance with one embodiment of the present invention.

FIG. 1 is an explanatory view showing a structure of an optical pick-up device. As shown in FIG. 1, the optical pick-up device in accordance with the present embodiment is structured so as to include a semiconductor laser 1, a collimator lens 2, a shaping prism 3, a polarization beam splitter 4, a quarter-wave plate 5, a diaphragm 14 (see FIG. 3), an objective lens 6, a detection-system condenser lens 8, a photodetector 9, and a lens holder 10. The optical pick-up device records/reproduces information on/from a disk 7.

Figure 2:
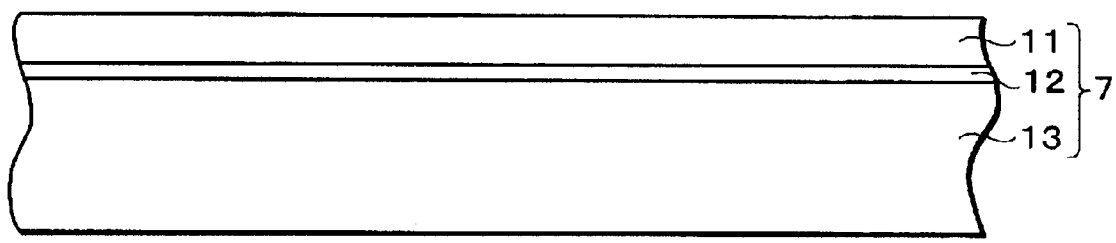
FIG. 2 is an explanatory view showing a structure of a disk.

As shown in FIG. 2, the disk 7 is arranged such that an information recording surface 12 and a light-transmissive layer 11 are formed in this order on a substrate 13. The light-transmissive layer 11 is made of glass, and has a thickness of 0.1 mm.

Incidentally, the disk 7 is satisfactorily specified as long as it is an optical-type disk, for example, an optical disk and a magneto-optical disk, and its kind is not limited.

Besides, the light-transmissive layer 11 is not limited to be made of glass, but may be made of a resin material.

The semiconductor laser 1 is a light source emitting, for example, a laser beam having a wavelength of 405 nm. The wavelength of the laser beam emitted from the semiconductor laser 1 is not particularly limited.

The collimator lens 2 converts the laser beam emitted from the semiconductor laser 1 to collimated light.

The shaping prism 3 changes the shape of an intensity distribution of the laser beam from an ellipse to virtually a circle.

The polarization beam splitter 4 is structured such that a polarizing film is provided on a slope of either of two rectangular prisms, and the slopes of the rectangular prisms are bonded so as to form a cube. Of the incident laser beam, a lightwave having a polarizing direction parallel to an incident surface passes through the polarization beam splitter 4, and a lightwave having a polarizing direction orthogonal to the incident surface is reflected by the polarization beam splitter 4.

The quarter-wave plate 5 converts linearly polarized light to circularly polarized light, and circularly polarized light to linearly polarized light. Besides, the quarter-wave plate 5 forms a light path difference by a quarter of the wavelength between a normal beam and an abnormal beam in the laser beam passing through it.

The diaphragm 14 limits the amount of light from the laser beam directed into the objective lens 6.

The objective lens 6 is fixed to the lens holder 10. The lens holder 10 is fixed to an actuator of the optical pick-up device with four wires (not shown). The objective lens 6 is driven by the actuator. The structure of the objective lens 6 will be described later.

The detection-system condenser lens 8 condenses reflected light from the disk 7 reflected by the polarization beam splitter 4 and irradiates the light onto the photodetector 9.

The photodetector 9 has a plurality of light receiving elements, and converts the incident light (laser beam) to an electric signal at each receiving element so as to carry out focus control.

The laser beam emitted from the semiconductor laser 1 and converted to parallel light by the collimator lens 2, with its beam shape changed by the shaping prism 3 from an ellipse to a circle, is then guided to the polarization beam splitter 4.

The laser beam passes through the polarization beam splitter 4, and is directed to the quarter-wave plate 5. The polarizing direction of the laser beam passing through the quarter-wave plate 5 is changed from linear to circular. The laser beam, with its light amount limited by the diaphragm 14, is then directed to the objective lens 6, passes through the light-transmissive layer 11 of the disk 7, and condenses on the information recording surface 12.

The laser beam condensed on the information recording surface 12 of the disk 7 is reflected on the information recording surface 12, passes through the objective lens 6 again, then is directed to the quarter-wave plate 5. The polarizing direction of the laser beam is changed by the quarter-wave plate 5 from circular to linear, and the polarizing direction of the linearly polarized light is 90° different from that of the foregoing laser beam directed to the disk 7. The linearly polarized light is then reflected by the polarization beam splitter 4.

In this manner, the polarization beam splitter 4 separates the laser beam directed to the disk 7 and the laser beam reflected from the disk 7.

The laser beam reflected by the polarization beam splitter 4 is condensed by the detection-system condenser lens 8, and received at a plurality of light receiving element regions in the photodetector 9. A signal outputted from each light receiving element region is processed by an arithmetic circuit (not shown) so as to be a focus error signal, a reproduction signal, or the like.

The following description will explain the objective lens 6.

Figure 3:
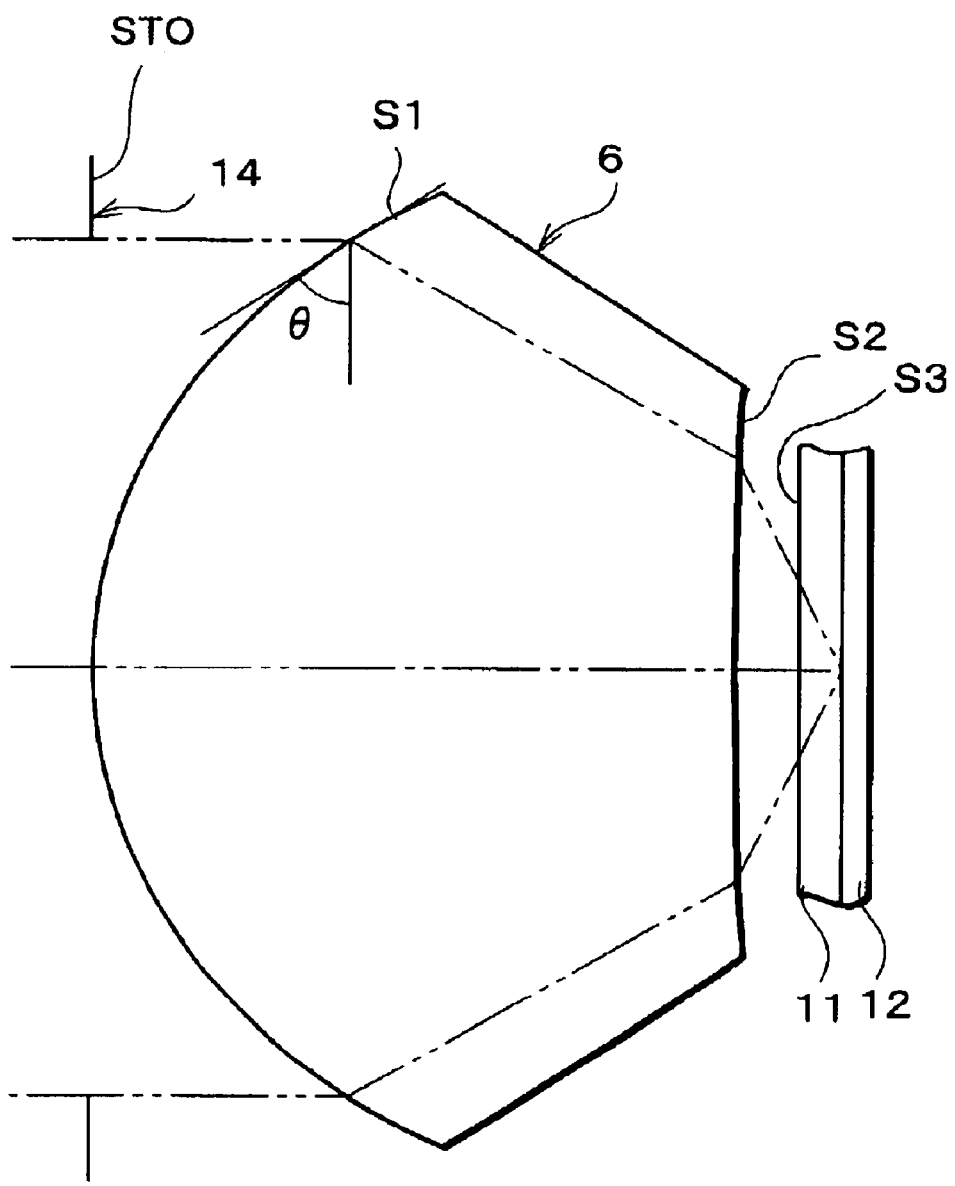
FIG. 3 is an explanatory view showing a structure of an objective lens and a diaphragm used in the optical pick-up device.

As shown in FIG. 3, the objective lens 6 is a single lens (a single-lens objective lens) both surfaces of which are aspherical and which is made of glass, and its NA is 0.85. Here, the aspherical shape satisfies the following equation (1):

$$Z = (1/r)y^2/[1 + \{1 - (1+K)(1/r)^2 y^2\}^{1/2}] + Ay^4 + By^6 + Cy^8 + Dy^{10} + Ey^{12} + Fy^{14} + Gy^{16} + Hy^{18} + Jy^{20}, \quad (1)$$

where $Z$ is a distance from a plane tangent to a surface apex, $y$ is a distance from an optical axis, $1/r$ is a curvature of an aspherical surface apex ($r$ is a curvature radius), $K$ is a circular cone constant, $A$ is an aspherical coefficient of the $y^4$ term, $B$ is an aspherical coefficient of the $y^6$ term, $C$ is an aspherical coefficient of the $y^8$ term, $D$ is an aspherical coefficient of the $y^{10}$ term, $E$ is an aspherical coefficient of the $y^{12}$ term, $F$ is an aspherical coefficient of the $y^{14}$ term, $G$ is an aspherical coefficient of the $y^{16}$ term, $H$ is an aspherical coefficient of the $y^{18}$ term, and $J$ is an aspherical coefficient of the $y^{20}$ term.

The objective lens 6 is a so-called infinite system lens having a light source, which is the semiconductor laser 1, located at an infinite distance from the objective lens 6. Here, in the diaphragm 14, the surface limiting the amount of the passing laser beam is referred to as an STO.

The laser beam emitted from the semiconductor laser 1 is collimated, and as shown in FIG. 3, directed via the diaphragm 14 (STO) to a first surface S1 (a surface of the objective lens 6 on which the laser beam is incident). The laser beam is emitted from a second surface S2 (a surface of the objective lens 6 from which the laser beam is emitted), directed to a third surface S3 (the light-transmissive layer 11), and forms an image at an image point (IMAGE) on the information recording surface 12, which faces an emission surface of the light-transmissive layer 11.

Table 1 shows surface intervals (mm) of the objective lens 6 and the light-transmissive layer 11 shown in FIG. 3, refractive indexes of glass constituting the objective lens 6 (glass refractive indexes), Abbe numbers for a d-lay (glass Abbe numbers), etc. Incidentally, up to the twelfth order of the aspherical shapes of the first surface S1 and the second surface S2 of the objective lens 6 are considered. Besides, the surface interval of the first surface S1 is a distance from the first surface S1 on the optical axis to the second surface S2, that is, a center thickness of the objective lens 6. The surface interval of the second surface S2 is a distance from the second surface S2 to the third surface S3. The surface interval of the third surface S3 is the thickness of the light-transmissive layer 11.

TABLE 1

| | SURFACE NO. | CURVATURE RADIUS (mm) | SURFACE INTERVAL (mm) | GLASS REFRACTIVE INDEX | GLASS ABBE NO. |
|---|---|---|---|---|---|
| DIAPHRAGM | STO | infinity | 0 | | |
| OBJECTIVE LENS | S1 | 1.43125 | 2.3 | 1.81691 | 47.32 |
| | | K: −0.685335 | | | |
| | | A: 0.128492E−01 B: 0.235931E−02 C: 0.673967E−04 | | | |
| | | D: 0.404804E−03 E: −0.233596E−03 | | | |
| | S2 | 66.82122 | 0.427 | | |
| | | K: 0.000000 | | | |
| | | A: 0.203696E+00 B: −0.760376E+00 C: 0.137865E+01 | | | |
| | | D: −0.12937E+01 E: 0.495345E+00 | | | |
| LIGHT-TRANSMISSIVE LAYER | S3 | infinity | 0.1 | 1.585 | 29.9 |
| | IMAGE | infinity | | | |

In addition, the objective lens 6 is designed so as to have virtually no aberration when the light-transmissive layer 11 of the disk 7 is 0.1 mm thick. When the incident laser beam has a wavelength of 405 nm, the refractive index n of the glass constituting the objective lens 6 is 1.81691, as shown in Table 1. Besides, in the objective lens 6, the numerical aperture NA is 0.85, a focal distance f is 1.763 mm, a focal distance f1 of the first surface S1 is 3.18 mm, an Abbe number ν for the d-line is 47.3, a center thickness t is 2.3, and an effective diameter 0 is 3 mm.

Here, the Abbe number ν for the d-lay is expressed by the following equation (2):

$$\nu=(nd-1)/(nF-nC), \quad (2)$$

Where nd is a refractive index for the d-line (wavelength: 587.6 nm) of a spectral line, nF is a refractive index for an F-line (wavelength: 486.1 nm) of a spectral line, and nC is a refractive index for a C-line (wavelength: 656.3 nm) of a spectral line. Incidentally, the effective diameter of the objective lens 6 is a diameter within which the laser beam can be directed to the objective lens 6.

Besides, the objective lens 6 satisfies the following condition (3):

$$0.5<f/f1<0.6, \quad (3)$$

where f is its focal distance, and f1 is the focal distance of the first surface S1.

Generally, in an objective lens, a spherical aberration is caused depending on the structure of the objective lens, such as the curvature at its aspherical surface apex, the shape, etc. In addition, when a recording medium such as a disk is inclined, a comatic aberration is caused in a laser beam. Besides, a laser beam in an X-axis direction and in a Y-axis direction comes to focus at different positions, which is called an astigmatism. Due to these aberrations, it becomes difficult to accurately condense the laser beam onto the disk.

However, by setting as 0.5<f/f1 as shown in the above condition (3), the focal distance of the first surface S1 can be shortened, that is, the curvature of the first surface S1 can be increased. With this arrangement, the refraction of the laser beam by the second surface S2 may be small, and as a result the curvature of the second surface S2 can be reduced. Consequently, a spherical aberration caused by the second surface S2 can be lessened.

Besides, by setting as f/f1<0.6, the focal distance of the first surface S1 can be increased, that is, the curvature of the first surface S1 can be reduced. With this arrangement, a working distance WD can be increased.

As shown in FIG. 3, the objective lens 6 is a meniscus lens in which the first surface S1, that is, a surface on a side to which a laser beam is directed, is convex. Therefore, a satisfactory out-of-axis characteristic can be obtained, and a comatic aberration and a spherical aberration can be lessened.

The objective lens 6 satisfies the following condition (4):

$$0.8<t/(NA\cdot D)<1.0, \quad (4)$$

where NA is its numerical aperture, D is its effective diameter, and t is a thickness at its center. By setting as 0.8<t/(NA·D), a satisfactory out-of-axis characteristic can be obtained.

Generally, when the numerical aperture NA and the effective diameter D of the objective lens 6 are determined, the relationship between the curvature of the first surface S1 and that of the second surface S2 of the objective lens 6 is virtually determined. Therefore, the most important factor to determine the weight (volume) of the objective lens 6 is the thickness of the objective lens 6. In other words, the objective lens 6 becomes heavier when it is thick, and becomes lighter when it is thin.

Consequently, by setting as t/(NA·D)<1.0, the volume and the weight of the objective lens 6 can be reduced. This structure allows high speed drive of the objective lens 6 in the optical pick-up device.

In addition, when t/(NA·D) is not less than 1.0, a preform (a spherical glass material in a pre-molding stage) is required in large volume to manufacture the objective lens 6. Here, if a preform of an ordinary size is used, the curvature radius of the preform becomes greater than the curvature radius of the first surface S1 of the objective lens 6, and thus space is formed between a central part of the first surface of a mold and glass which becomes the objective lens 6. Therefore, since gas stays in the space, the formed objective lens 6 tends to have shape failure.

However, by setting as t/(NA·D)<1.0, the objective lens 6 can be manufactured without shape failure.

Figure 8:
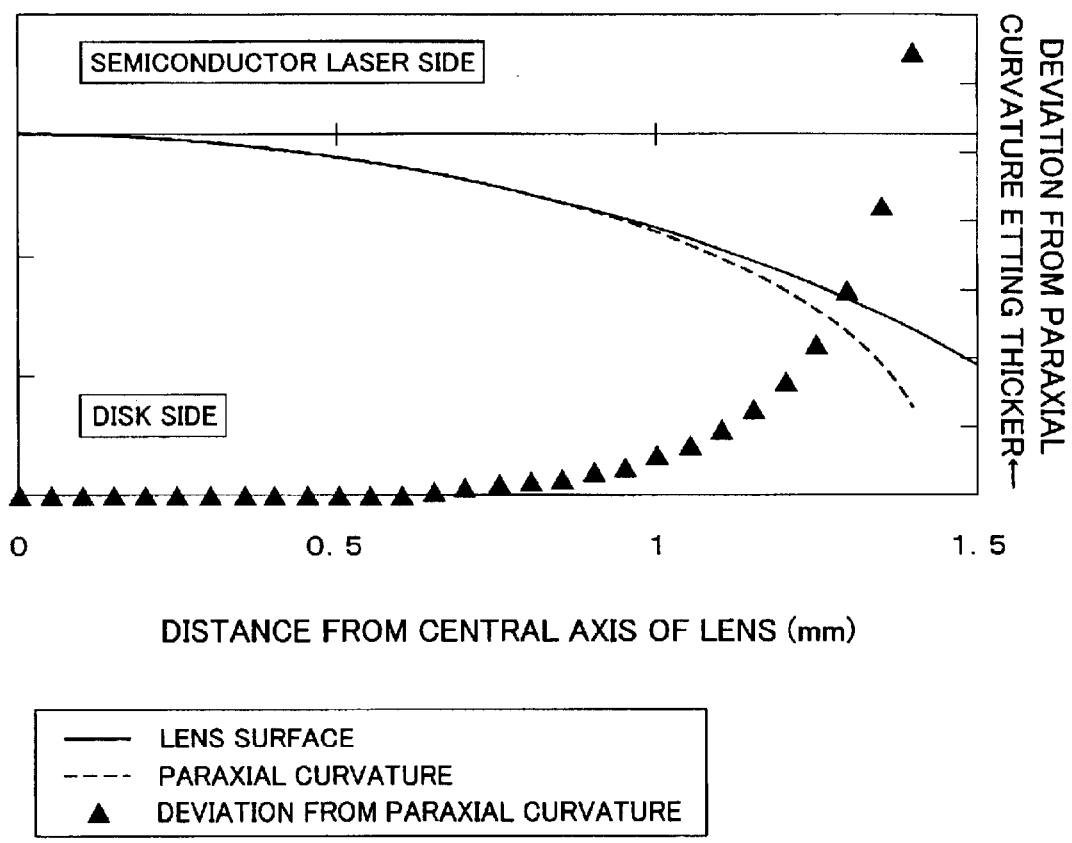
FIG. 8 is a graph showing the relationship between a distance (mm) from the central axis and a deviation from a paraxial curvature on a first surface of the objective lens.
Figure 9:
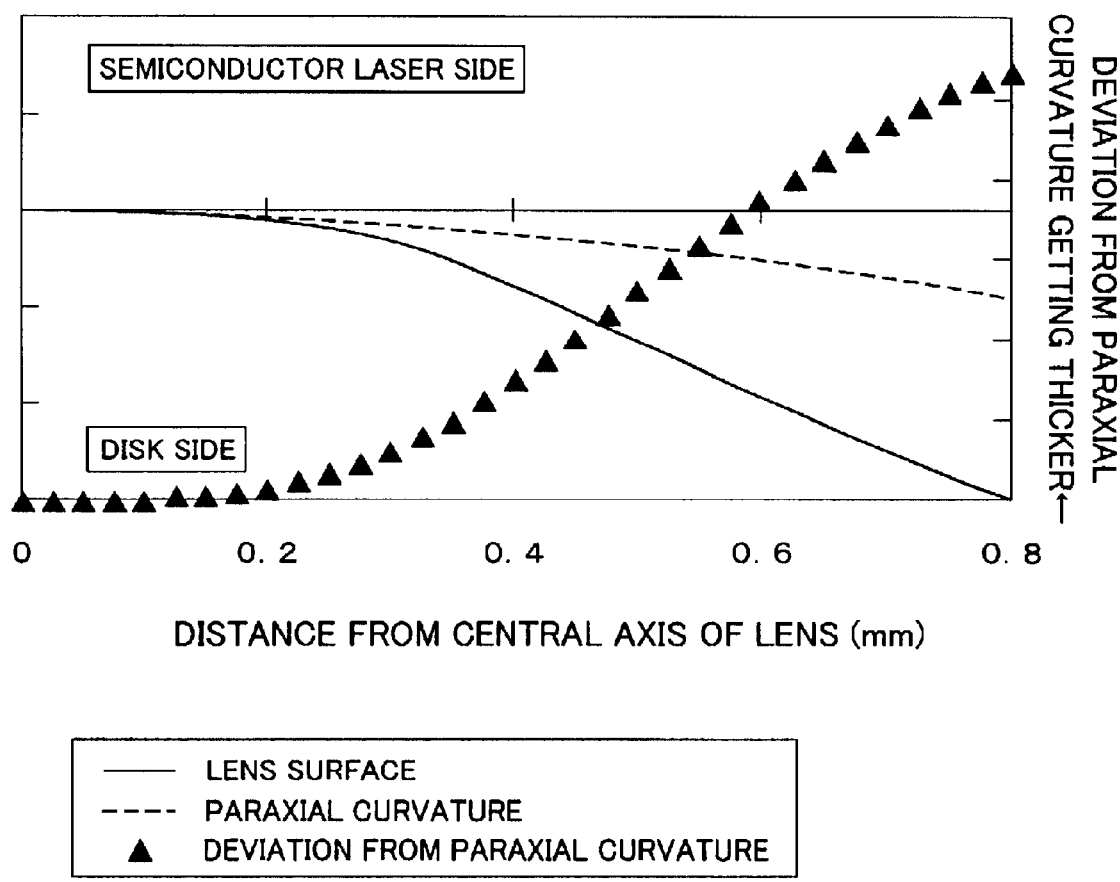
FIG. 9 is a graph showing the relationship between a distance from the central axis and a deviation from a paraxial curvature on a second surface of the objective lens.

Both of the first surface S1 and the second surface S2 of the objective lens 6 are shaped such that the objective lens 6 becomes thicker monotonously compared with a spherical surface expressed by a paraxial curvature radius, with getting far from the center, that is, the surface apex. FIG. 8 shows a deviation of the first surface S1 from a spherical surface expressed by a paraxial curvature radius, and FIG. 9 shows a deviation of the second surface S2 from a spherical surface expressed by a paraxial curvature radius.

This arrangement can lessen a steep surface tilt of the objective lens 6 due to high NA of the objective lens 6. Consequently, a mold for the objective lens 6 can be easily manufactured, and a spherical aberration can be lessened.

The objective lens 6 also satisfies the following condition (5):

$$60\cdot NA<\theta, \quad (5)$$

where NA is the numerical aperture of the objective lens 6, and θ (degree) is an angle formed by a line tangent to the surface of the objective lens 6 at a point to which light having the greatest incident height is directed within the effective diameter of the first surface S1 (the surface of the objective lens 6 on the side to which light is directed), and a normal to the optical axis of the incident light. In other words, as shown in FIG. 3, the angle θ is an angle formed by a line tangent to the surface of the objective lens 6 at a point on the perimeter of a laser beam which is limited by the diaphragm 14 and irradiated to the objective lens 6, and a normal to the optical axis of the laser beam.

Generally, in order to restrain a comatic aberration, it is necessary to increase the angle θ, or thicken the objective lens 6. An increase in the angle θ makes the curve of the first surface S1 of the objective lens 6 steeper. With this structure, a comatic aberration can be restrained even when the laser beam is directed to the objective lens 6 in a slanting direction.

Therefore, since the angle θ can be increased by satisfying the foregoing condition (5), a satisfactory out-of-axis characteristic can be obtained even in a thin objective lens.

The objective lens 6 satisfies the following condition (6):

$$D/(20 \cdot NA^5) < WD, \quad (6)$$

where NA is the numerical aperture, D is the effective diameter, and WD is the working distance of the objective lens 6.

With this arrangement, the working distance WD can be increased. Therefore, the distance between the objective lens 6 and the disk 7 can be satisfactorily maintained, constituting a stable system.

Figure 4:
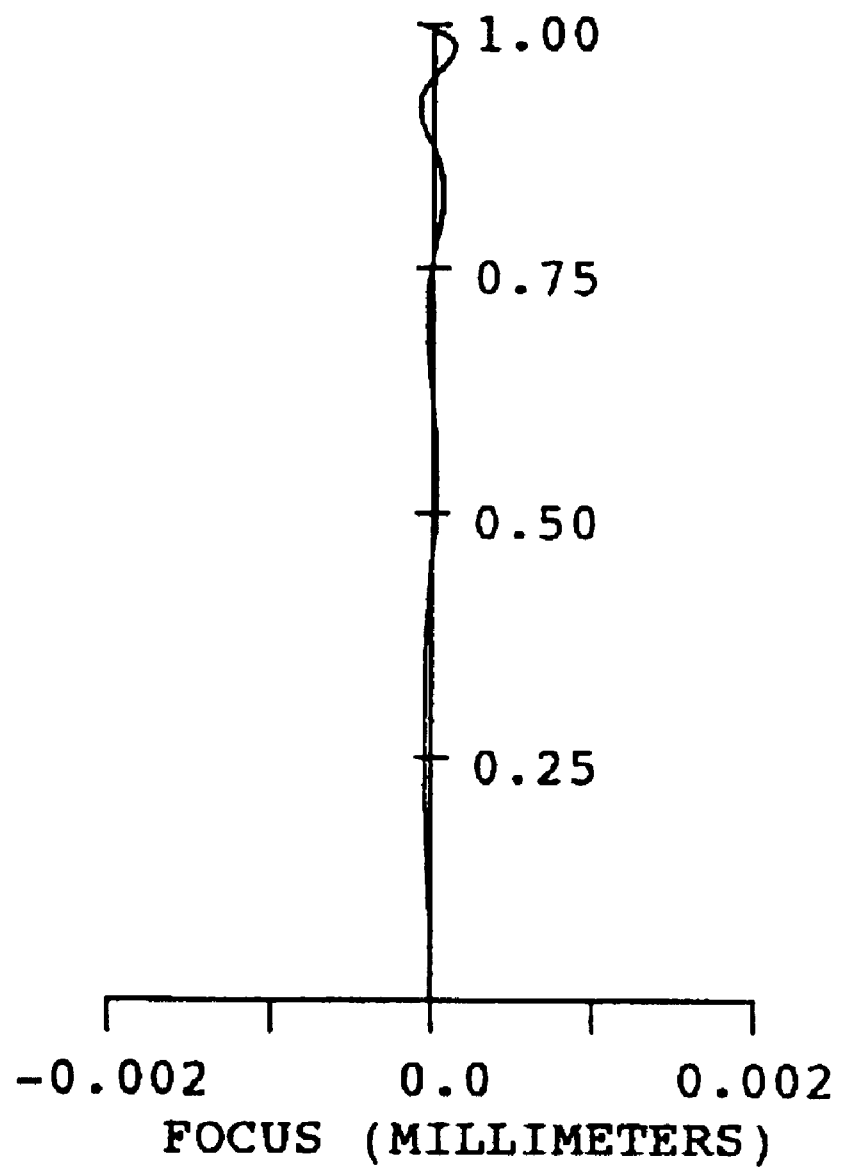
FIG. 4 is a graph showing a spherical aberration of the objective lens shown in FIG. 3.
Figure 5:
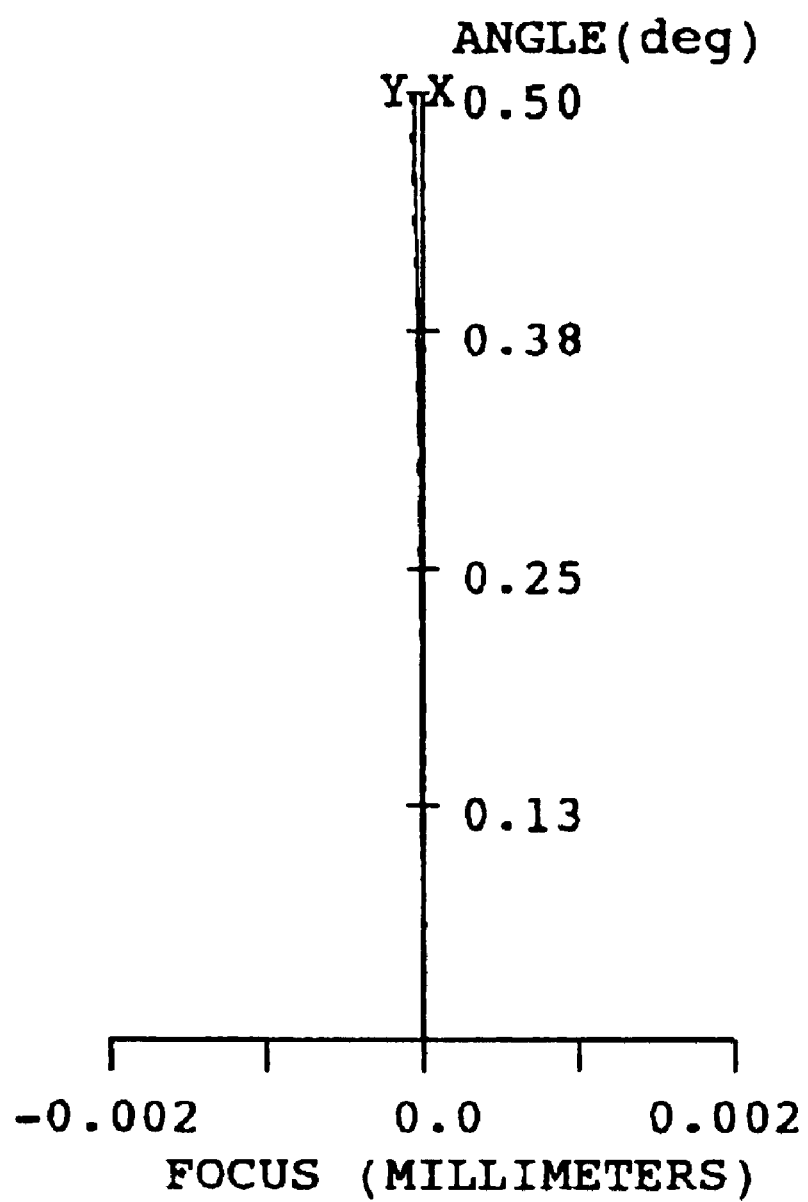
FIG. 5 is a graph showing an astigmatism of the objective lens shown in FIG. 3.

Here, FIG. 4 shows a spherical aberration (longitudinal spherical aberration), and FIG. 5 shows an astigmatism (astigmatic field curves), when using the objective lens 6 shown in Table 1 and FIG. 3. Incidentally, the X-axis direction is a direction parallel to the direction connecting the polarization beam splitter 4 and the detection-system condenser lens 8 on a plane parallel to the light-transmissive layer 11. The Y-axis direction is a direction perpendicular to the X-axis direction on a plane parallel to the light-transmissive layer 11.

As shown in FIG. 4, a spherical aberration can be restrained by using the objective lens 6. Besides, as shown in FIG. 5, an astigmatism can be restrained by using the objective lens 6.

FIGS. 6(a) and 6(b) are graphs showing lateral aberrations when an incident angle of a laser beam to the objective lens 6 is 0.5°. FIGS. 7(a) and 7(b) are graphs showing lateral aberrations when an incident angle of a laser beam to the objective lens 6 is 0°.

As shown in FIGS. 6(a) and 6(b) and FIGS. 7(a) and 7(b), by using the objective lens 6, aberrations in the X-axis direction and the Y-axis direction can be lessened, and a comatic aberration can also be restrained.

Next, the following description will explain a method for correcting a manufacturing error of the objective lens 6.

When manufacturing the objective lens 6, the tilts of both surfaces of the objective lens 6 vary by ±1 to 2 minutes, considering the accuracy for positioning a mold at the time of molding, the accuracies of the weight and the volume of the preform, which is a material for the objective lens 6, the accuracy of processing the mold, etc. Besides, the deviation of the centers of the both surfaces of the objective lens 6 is around ±5 μm. A comatic aberration is caused due to such the tilts and the center deviation of the both surfaces of the objective lens 6.

On the other hand, in the optical pick-up device, a fully focused, satisfactory beam is obtained as long as the aberration of a beam spot on the information recording surface 12 of the disk 7 is not more than 0.07 λ in the r.m.s. value of a wavefront (Marechal Criteria). When distributing this allowable aberration to optical parts, it is necessary to restrain the aberration in the objective lens 6 at around 0.03 λ. Here, λ is a wavelength.

The comatic aberration caused by the tilts and the center deviation of the both surfaces of the objective lens 6, that is, the first surface S1 and the second surface S2, can be corrected, for example, by adjusting the tilt of the objective lens 6 (an objective lens tilt) and the tilt of the disk 7 (a disk tilt).

Figure 10:
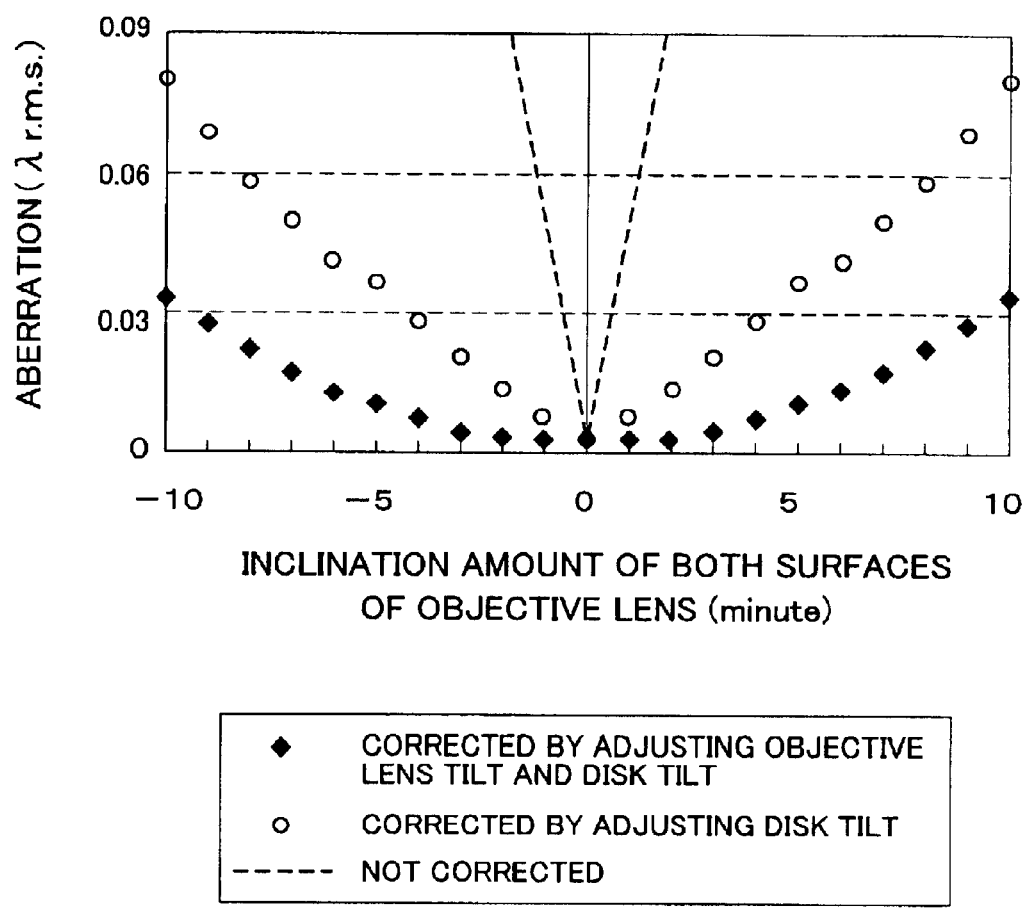
FIG. 10 is a graph showing a comatic aberration when a tilt error of the both surfaces of the objective lens with respect to a designed value is from −10 minutes to 10 minutes.

For example, FIG. 10 shows a case where a comatic aberration caused when a tilt error of the both surfaces of the objective lens 6 with respect to a designed value is from −10 minutes to 10 minutes is not corrected, a case where the comatic aberration is corrected by adjusting the tilt of the disk 7, and a case where the comatic aberration is corrected by adjusting both the tilt of the objective lens 6 and the tilt of the disk 7.

As shown in FIG. 10, even when the tilt error of the-both surfaces of the objective lens 6 with respect to a designed value is around ±2 minutes, the above-mentioned correction can correct the comatic aberration to be around 0.03 λ. In this manner, the comatic aberration can be easily corrected, and such an objective lens 6 can be easily manufactured.

Figure 11:
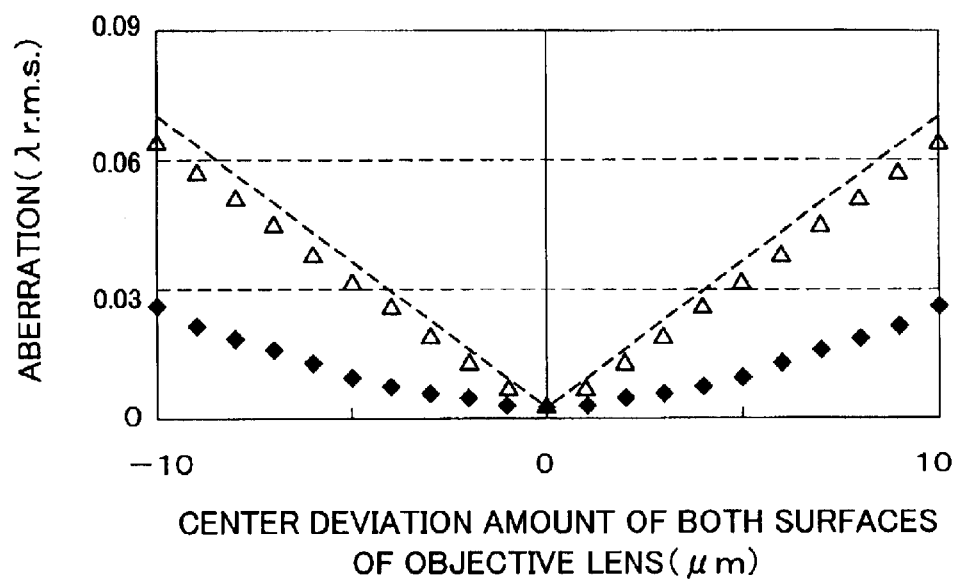
FIG. 11 is a graph showing a comatic aberration when a center deviation error of the both surfaces of the objective lens with respect to a designed value is from −20 $\mu$m to 20 $\mu$m.

Besides, FIG. 11 shows a case where a comatic aberration caused when a center deviation error of both surfaces of the objective lens 6 with respect to a designed value is from −20 μm to 20 μm is not corrected, a case where the comatic aberration is corrected by adjusting the tilt of the objective lens 6, and a case where the comatic aberration is corrected by adjusting both the tilt of the objective lens 6 and the tilt of the disk 7.

As shown in FIG. 11, even when the center deviation error of the both surfaces of the objective lens 6 with respect to a designed value is around ±5 μm, the above-mentioned direction can correct the comatic aberration to be around 0.03 λ. In this manner, the comatic aberration can be easily corrected, and such an objective lens 6 can be easily manufactured.

Consequently, even when the objective lens 6 has a large manufacturing error and a comatic aberration is caused, the comatic aberration can be corrected by adjusting the tilt of the objective lens 6 and the tilt of the disk 7, and can be lessened. Such an adjustment may be carried out when mounting the objective lens 6 on the optical pick-up device, or when mounting the optical pick-up device on a recording/reproducing device.

Here, the tilt of the objective lens 6 and the tilt of the disk 7 may be adjusted and fixed optimally while observing/detecting the form of the focused laser beam and an aberration by means for detecting a jitter and an envelope of a reproduction signal, means for detecting a separate aberration, or by the objective lens 6.

Besides, a spherical aberration is caused when the objective lens 6 has thickness irregularities. Such a spherical aberration can be corrected by adjusting the distance between the semiconductor laser 1 and the collimator lens 2 by correction means (not shown).

Incidentally, the spherical aberration may be corrected by additionally mounting an optical system such as a so-called beam expander, in which two convex lenses, or, one convex lens and one concave lens, are combined.

In addition, the structure of the objective lens is not limited to that shown in Table 1 and FIG. 3, and an objective lens 20 shown in the following Table 2 and FIG. 12 may also be used. The conditions of the objective lens 20, except for the conditions shown in Table 2, such as the numerical aperture NA and the focal distance, are the same as those of the objective lens 6 shown in Table 1 and FIG. 3.

TABLE 2

| SURFACE NO. | CURVATURE RADIUS (mm) | SURFACE INTERVAL (mm) | GLASS REFRACTIVE INDEX | GLASS ABBE NO. |
|---|---|---|---|---|
| DIAPHRAGM | STO | infinity | 0 | | |
| OBJECTIVE LENS | S1 | 1.4018 | 2.3 | 1.77848 | 45.6 |
| | K: −0.664349 | | | | |
| | A: 0.122959E−01 B: 0.242029E−02 C: 0.354363E−04 | | | | |
| | D: 0.559650E−03 E: −0.298583E−03 | | | | |
| | S2 | −18.23206 | 0.435 | | |
| | K: 0.000000 | | | | |
| | A: 0.287449E+00 B: −0.926608E+00 C: 0.15739E+01 | | | | |
| | D: −0.137219E+01 E: 0.495345E+00 | | | | |
| LIGHT-TRANSMISSIVE LAYER | S3 | infinity | 0.1 | 1.585 | 29.9 |
| | IMAGE | infinity | | | |

Figure 12:
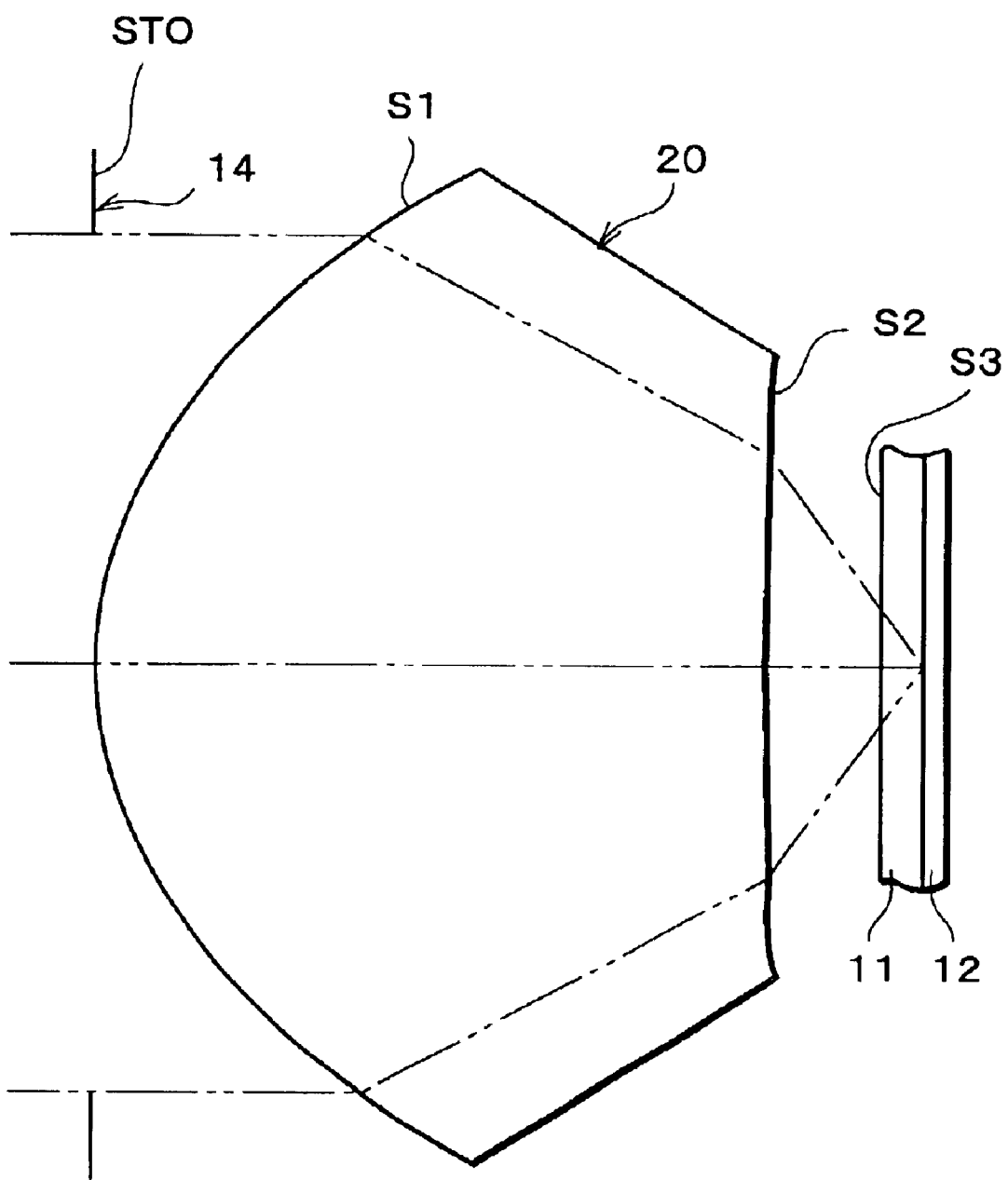
FIG. 12 is an explanatory view showing another structure of the objective lens.
Figure 13:
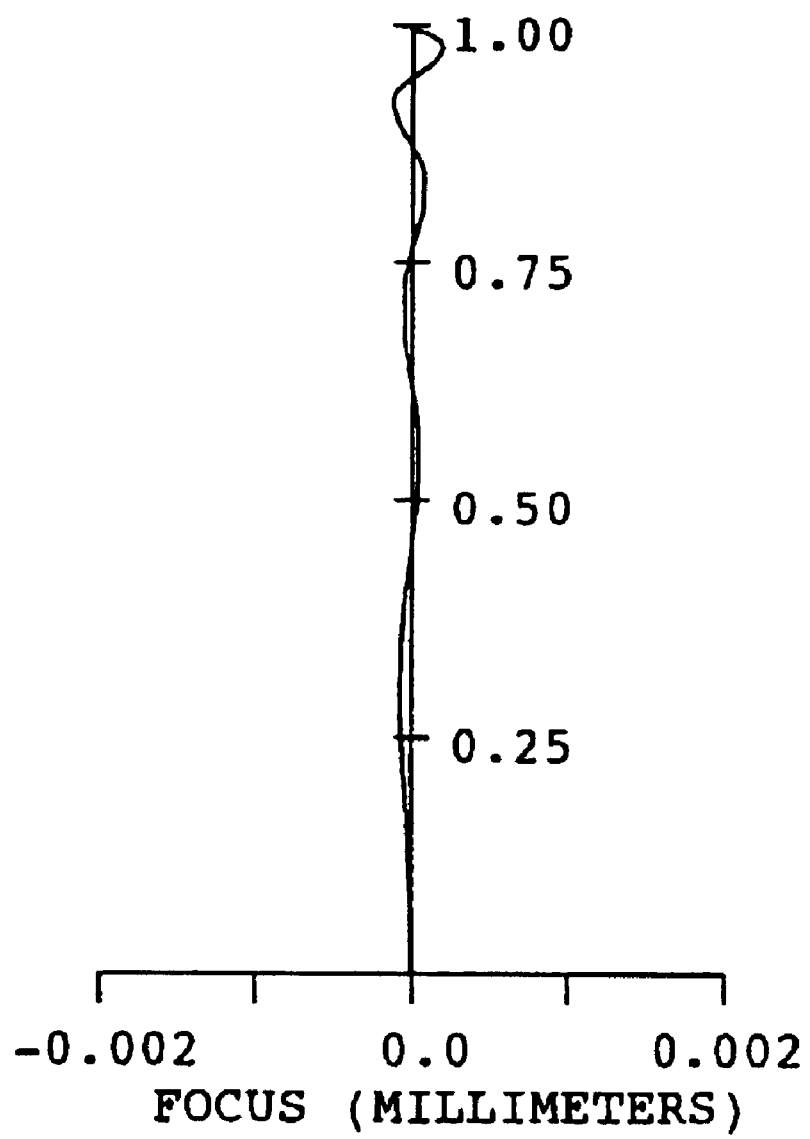
FIG. 13 is a graph showing a spherical aberration of the objective lens shown in FIG. 12.
Figure 14:
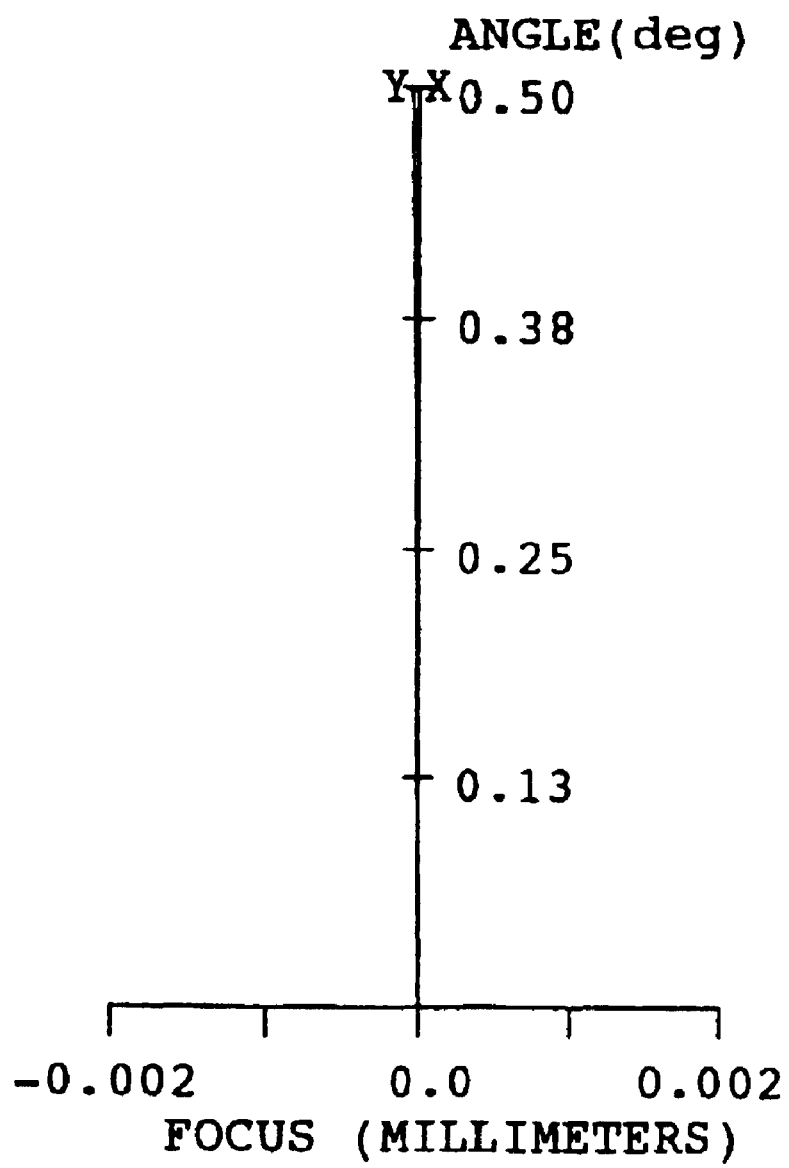
FIG. 14 is a graph showing an astigmatism of the objective lens shown in FIG. 12.

Here, FIG. 13 shows a spherical aberration, and FIG. 14 shows an astigmatism, when using the objective lens 20 shown in Table 2 and FIG. 12 as the objective lens.

As shown in FIG. 13, a spherical aberration can be restrained by using the objective lens 20. Besides, as shown in FIG. 14, an astigmatism can be restrained by using the objective lens 20.

FIGS. 15(a) and 15(b) are graphs showing lateral aberrations when an incident angle of a laser beam to the objective lens 20 is 0.5°. FIGS. 16(a) and 16(b) are graphs showing lateral aberrations when an incident angle of a laser beam to the objective lens 20 is 0°.

As shown in FIGS. 15(a) and 15(b) and FIGS. 16(a) and 16(b), by using the objective lens 20, aberrations in the X-axis direction and the Y-axis direction can be lessened, and a comatic aberration can also be restrained.

The objective lens may be structured as an objective lens 30 shown in the following Table 3 and FIG. 17. The conditions of the objective lens 30, except for the conditions shown in Table 3, such as the numerical aperture NA and the focal distance, are the same as those of the objective lens 6 shown in Table 1 and FIG. 3.

Figure 17:
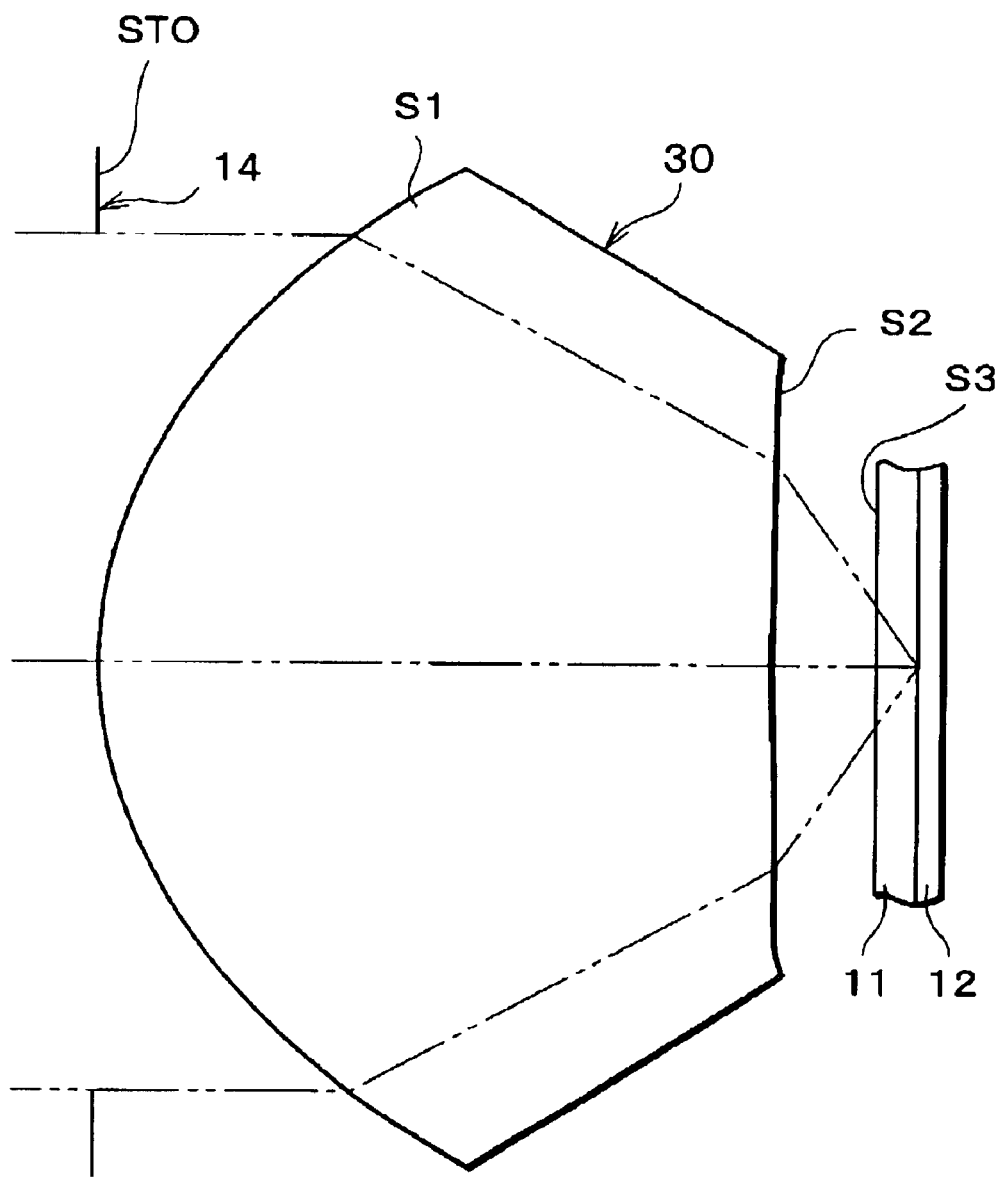
FIG. 17 is an explanatory view showing still another structure of the objective lens.
Figure 18:
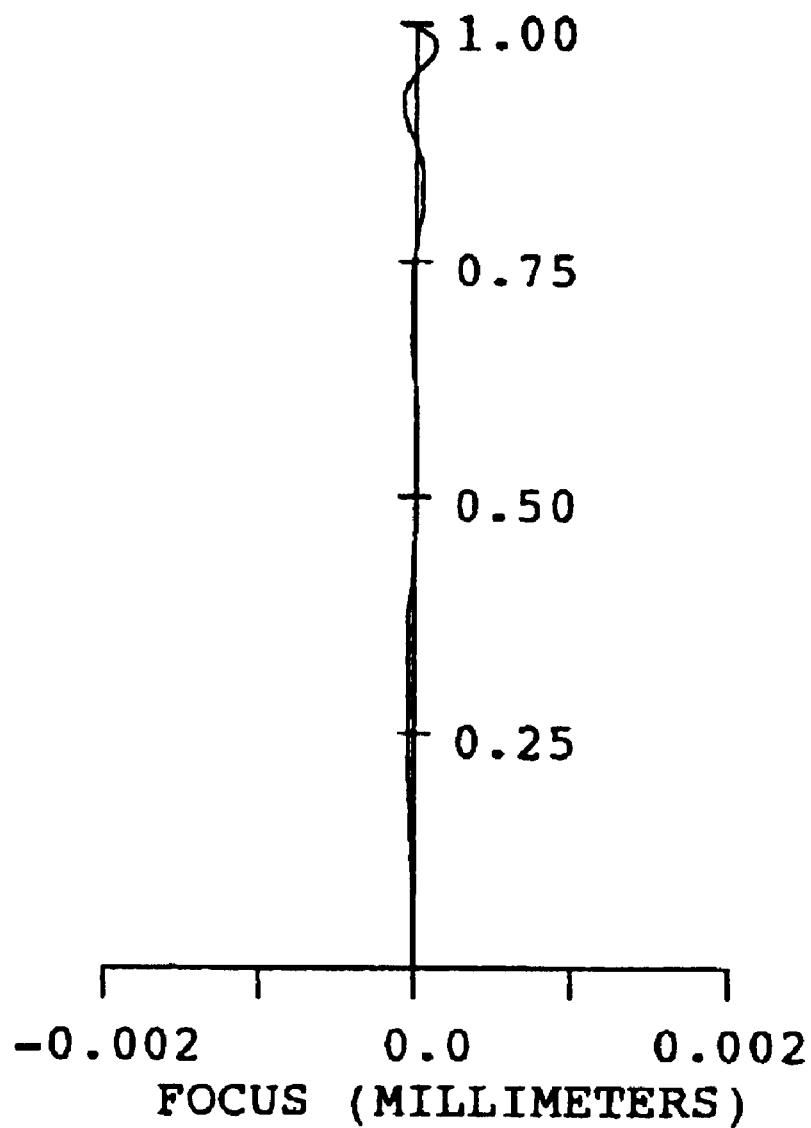
FIG. 18 is a graph showing a spherical aberration of the objective lens shown in FIG. 17.
Figure 19:
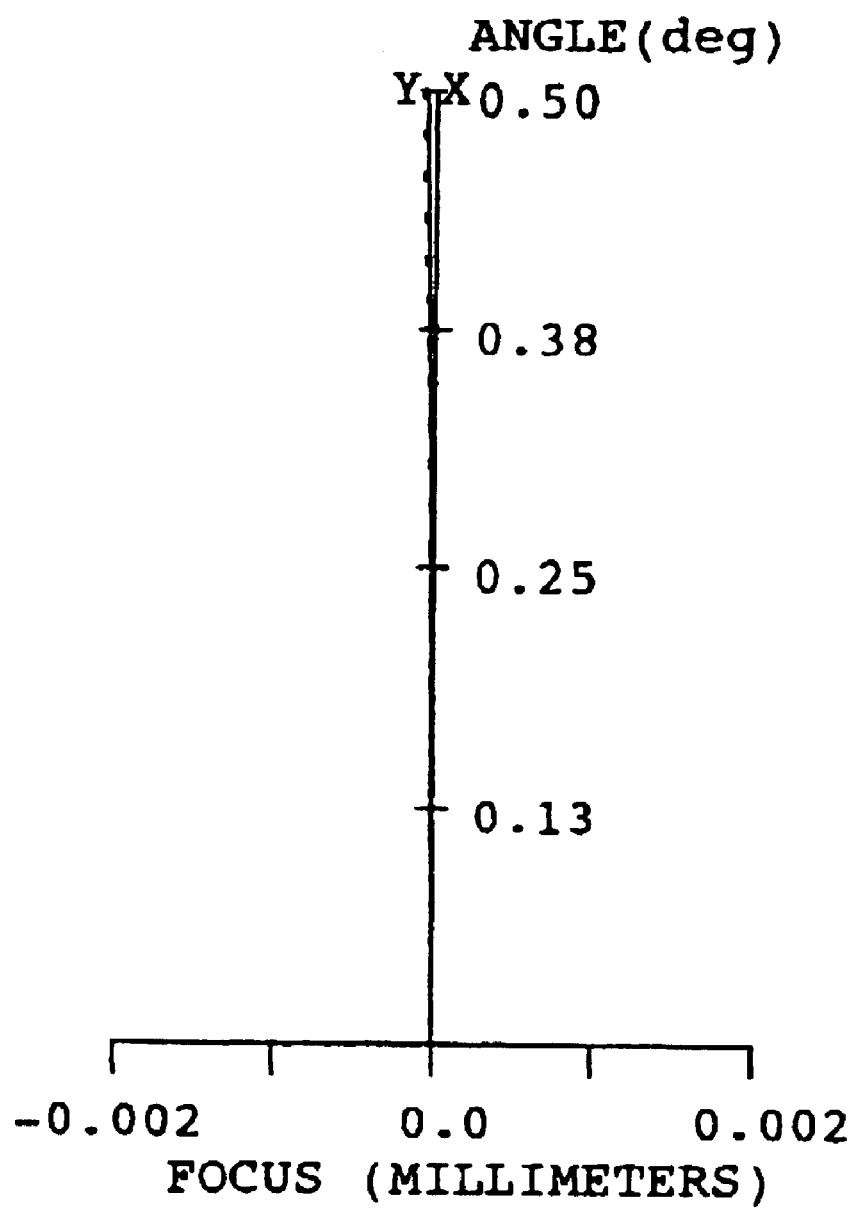
FIG. 19 is a graph showing an astigmatism of the objective lens shown in FIG. 17.

Here, FIG. 18 shows a spherical aberration, and FIG. 19 shows an astigmatism, when using the objective lens 30 shown in Table 3 and FIG. 17 as the objective lens.

As shown in FIG. 18, a spherical aberration can be restrained by using the objective lens 30. Besides, as shown in FIG. 19, an astigmatism can be restrained by using the objective lens 30.

Figure 20A:
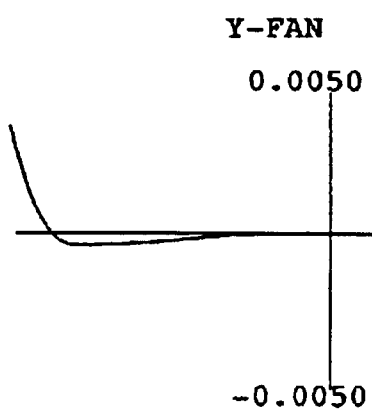
FIG. 20(a) is a graph showing a lateral aberration in a Y-axis direction when an incident angle of a laser beam to the objective lens shown in FIG. 17 is 0.5°.
Figure 20B:
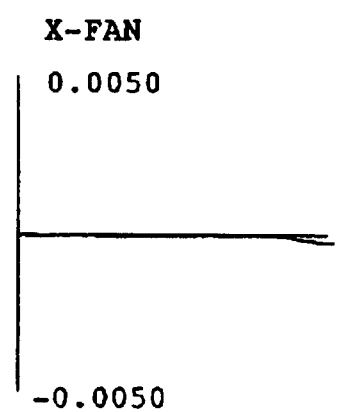
FIG. 20(b) is a graph showing a lateral aberration in an X-axis direction when an incident angle of a laser beam to the objective lens shown in FIG. 17 is 0.5°.
Figure 21A:
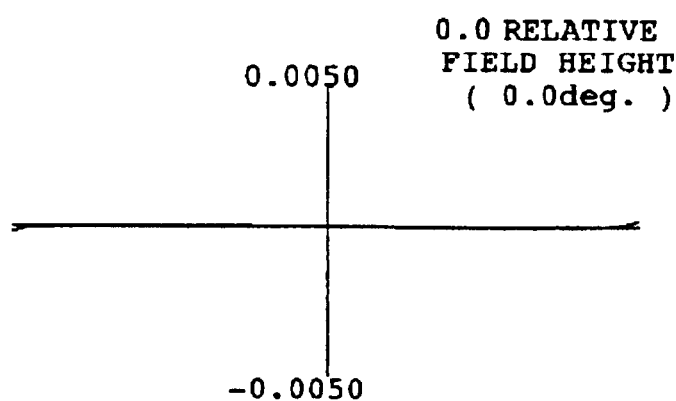
FIG. 21(a) is a graph showing a lateral aberration in a Y-axis direction when an incident angle of a laser beam to the objective lens shown in FIG. 17 is 0°.
Figure 21B:
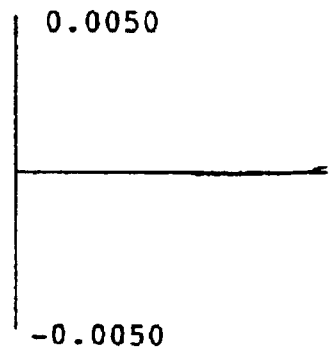
FIG. 21(b) is a graph showing a lateral aberration in an X-axis direction when an incident angle of a laser beam to the objective lens shown in FIG. 17 is 0°.

FIGS. 20(a) and 20(b) are graphs showing lateral aberrations when an incident angle of a laser beam to the objective lens 30 is 0.5°. FIGS. 21(a) and 21(b) are graphs showing lateral aberrations when an incident angle of a laser beam to the objective lens 30 is 0°.

As shown in FIGS. 20(a) and 20(b) and FIGS. 21(a) and 21(b), by using the objective lens 30, aberrations in the X-axis direction and the Y-axis direction can be lessened, and a comatic aberration can also be restrained.

The objective lens may be structured as an objective lens 40 shown in the following Table 4 and FIG. 22. The conditions of the objective lens 40, except for the conditions shown in Table 4, such as the numerical aperture NA and the focal distance, are the same as those of the objective lens 6 shown in Table 1 and FIG. 3.

TABLE 3

| SURFACE NO. | CURVATURE RADIUS (mm) | SURFACE INTERVAL (mm) | GLASS REFRACTIVE INDEX | GLASS ABBE NO. |
|---|---|---|---|---|
| DIAPHRAGM | STO | infinity | 0 | | |
| OBJECTIVE LENS | S1 | 1.4338 | 2.3 | 1.81980 | 40.9 |
| | K: −0.674408 | | | | |
| | A: 0.123635E−01 B: 0.224806E−02 C: 0.848056E−04 | | | | |
| | D: 0.383485E−03 E: −0.228839E−03 | | | | |
| | S2 | 51.7489 | 0.427 | | |
| | K: 0.000000 | | | | |
| | A: 0.200270E+00 B: −0.755195E+00 C: 0.137379E+01 | | | | |
| | D: −0.129167E+01 E: 0.495345E+00 | | | | |
| LIGHT-TRANSMISSIVE LAYER | S3 | infinity | 0.1 | 1.585 | 29.9 |
| | IMAGE | infinity | | | |

TABLE 4

| | SURFACE NO. | CURVATURE RADIUS (mm) | SURFACE INTERVAL (mm) | GLASS REFRACTIVE INDEX | GLASS ABBE NO. |
|---|---|---|---|---|---|
| DIAPHRAGM | STO | infinity | 0 | | |
| OBJECTIVE LENS | S1 | 1.47761 | 2.3 | 1.85403 | 37.0 |
| | | K: −0.488125 | | | |
| | | A: 0.355215E−02 B: 0.206889E−03 C: 0.157953E−02 | | | |
| | | D: −0.309299E−02 E: 0.226127E−02 F: −0.588088E−03 | | | |
| | | G: −0.899627E−04 H: 0.433863E−04 J: −0.135085E−05 | | | |
| | S2 | 22.79607 | 0.437 | | |
| | | K: 0.000000 | | | |
| | | A: 0.779128E−01 B: −0.110076E+00 C: −0.203585E+00 | | | |
| | | D: 0.343089E+00 E: 0.195929E+00 F: −0.393015E+00 | | | |
| | | G: −0.208769E−03 H: 0.568055E−01 J: −0.117780E−03 | | | |
| LIGHT-TRANSMISSIVE LAYER | S3 | infinity | 0.1 | 1.585 | 29.9 |
| | IMAGE | infinity | | | |

Figure 22:
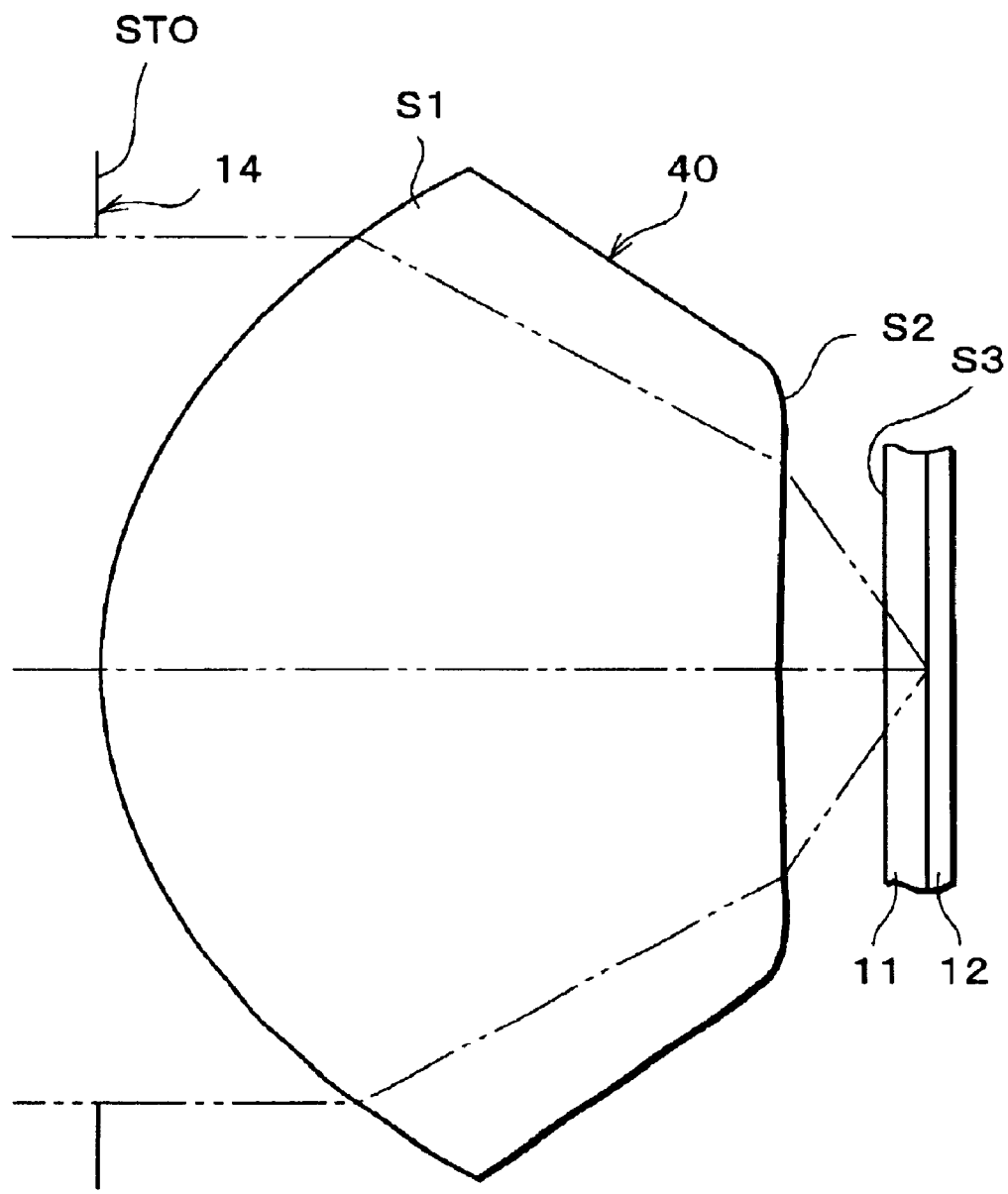
FIG. 22 is an explanatory view showing still another structure of the objective lens.
Figure 23:
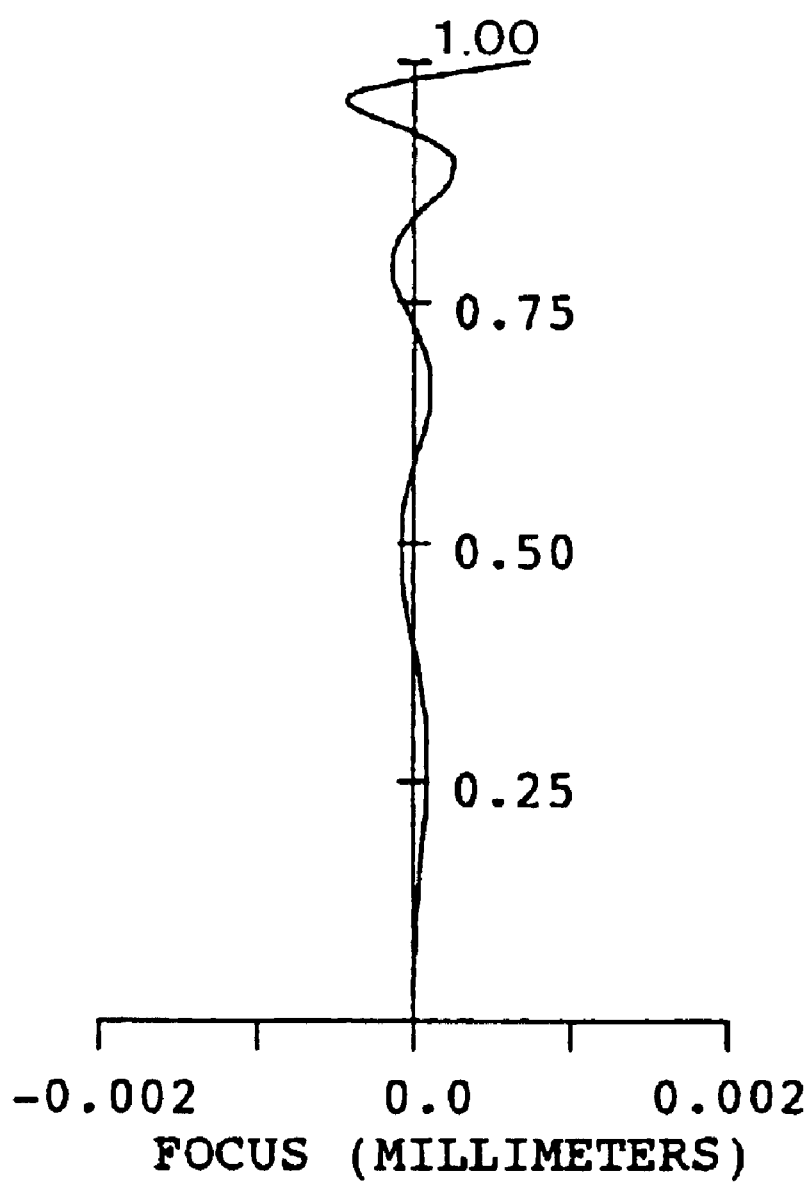
FIG. 23 is a graph showing a spherical aberration of the objective lens shown in FIG. 22.
Figure 24:
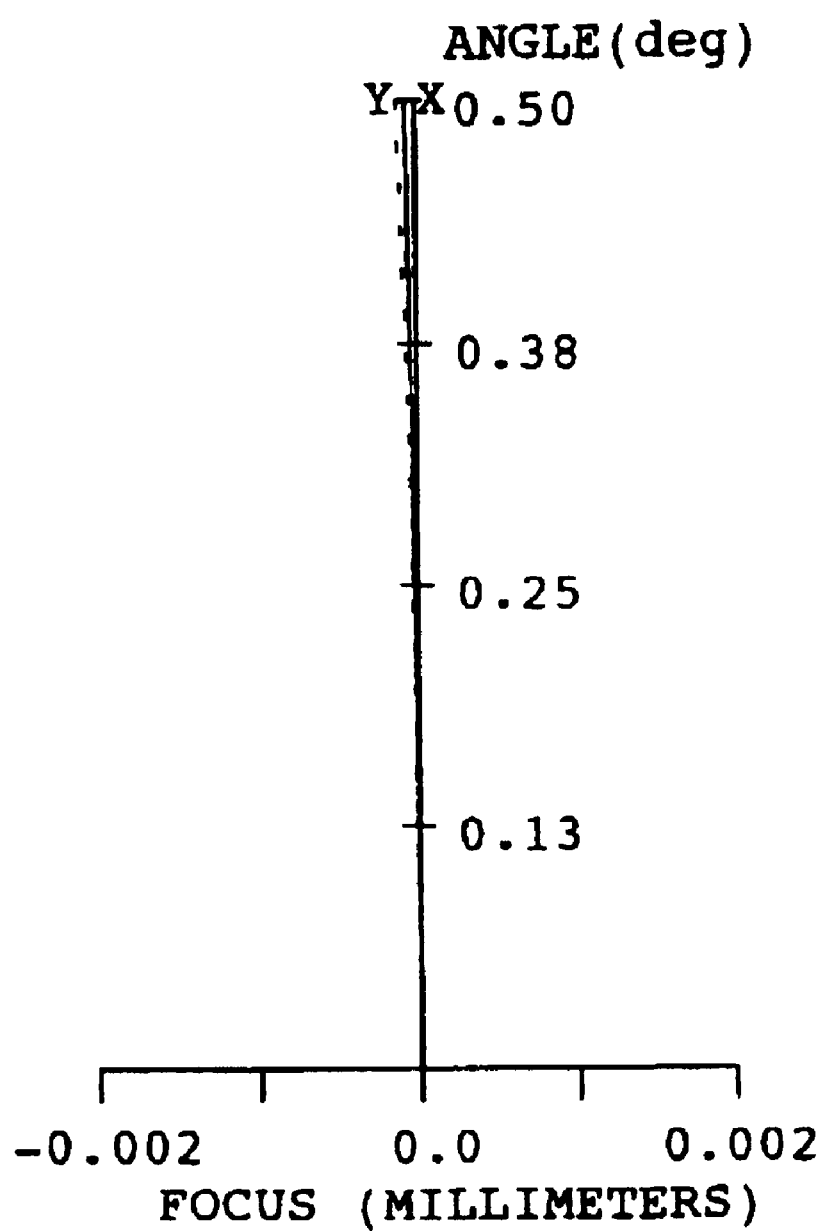
FIG. 24 is a graph showing an astigmatism of the objective lens shown in FIG. 22.

Here, FIG. 23 shows a spherical aberration, and FIG. 24 shows an astigmatism, when using the objective lens 40 shown in Table 4 and FIG. 22 as the objective lens.

As shown in FIG. 23, a spherical aberration can be restrained by using the objective lens 40. Besides, as shown in FIG. 24, an astigmatism can be restrained by using the objective lens 40.

Figures 25A, 25B:
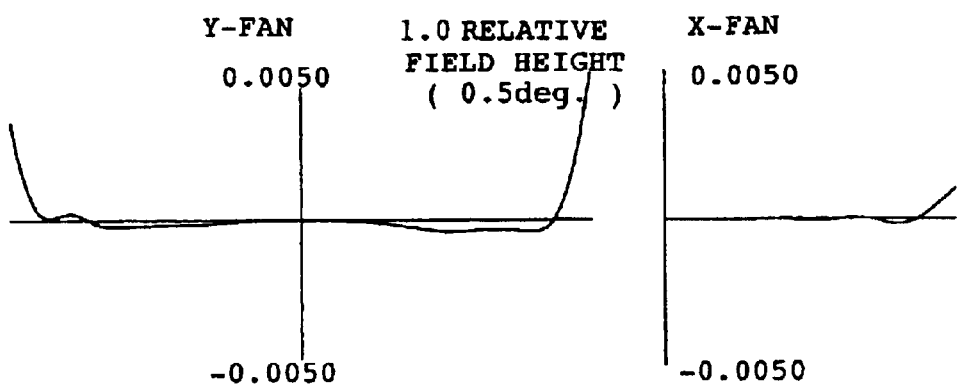
FIG. 25(a) is a graph showing a lateral aberration in a Y-axis direction when an incident angle of a laser beam to the objective lens shown in FIG. 22 is 0.5°.
FIG. 25(b) is a graph showing a lateral aberration in an X-axis direction when an incident angle of a laser beam to the objective lens shown in FIG. 22 is 0.5°.
Figures 26A, 26B:
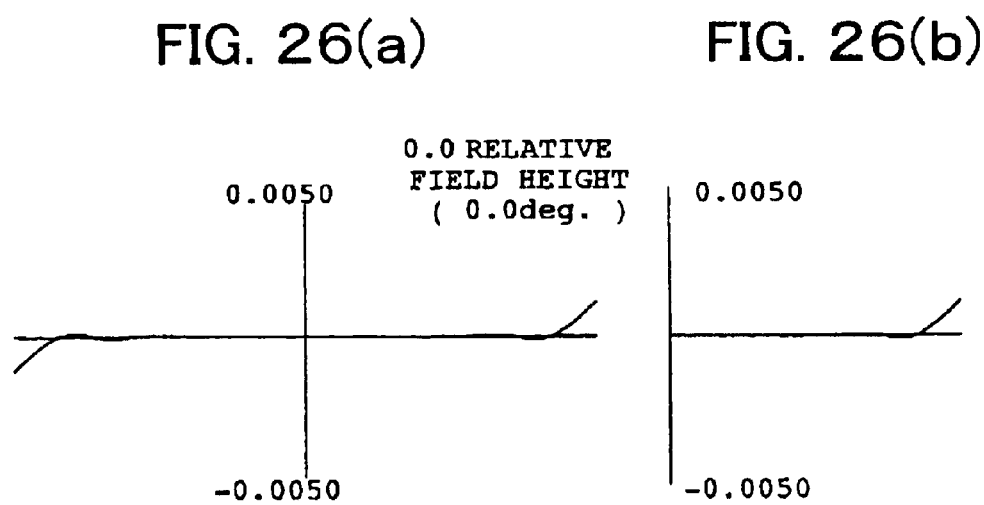
FIG. 26(a) is a graph showing a lateral aberration in a Y-axis direction when an incident angle of a laser beam to the objective lens shown in FIG. 22 is 0°.
FIG. 26(b) is a graph showing a lateral aberration in an X-axis direction when an incident angle of a laser beam to the objective lens shown in FIG. 22 is 0°.

FIGS. 25(a) and 25(b) are graphs showing lateral aberrations when an incident angle of a laser beam to the objective lens 40 is 0.5°. FIGS. 26(a) and 26(b) are graphs showing lateral aberrations when an incident angle of a laser beam to the objective lens 40 is 0°.

As shown in FIGS. 25(a) and 25(b) and FIGS. 26(a) and 26(b), by using the objective lens 40, aberrations in the X-axis direction and the Y-axis direction can be lessened, and a comatic aberration can also be restrained.

The objective lens may be structured as an objective lens 50 shown in the following Table 5 and FIG. 27. The conditions of the objective lens 50, except for the conditions shown in Table 5, such as the numerical aperture NA and the focal distance, are the same as those of the objective lens 6 shown in Table 1 and FIG. 3.

Figure 27:
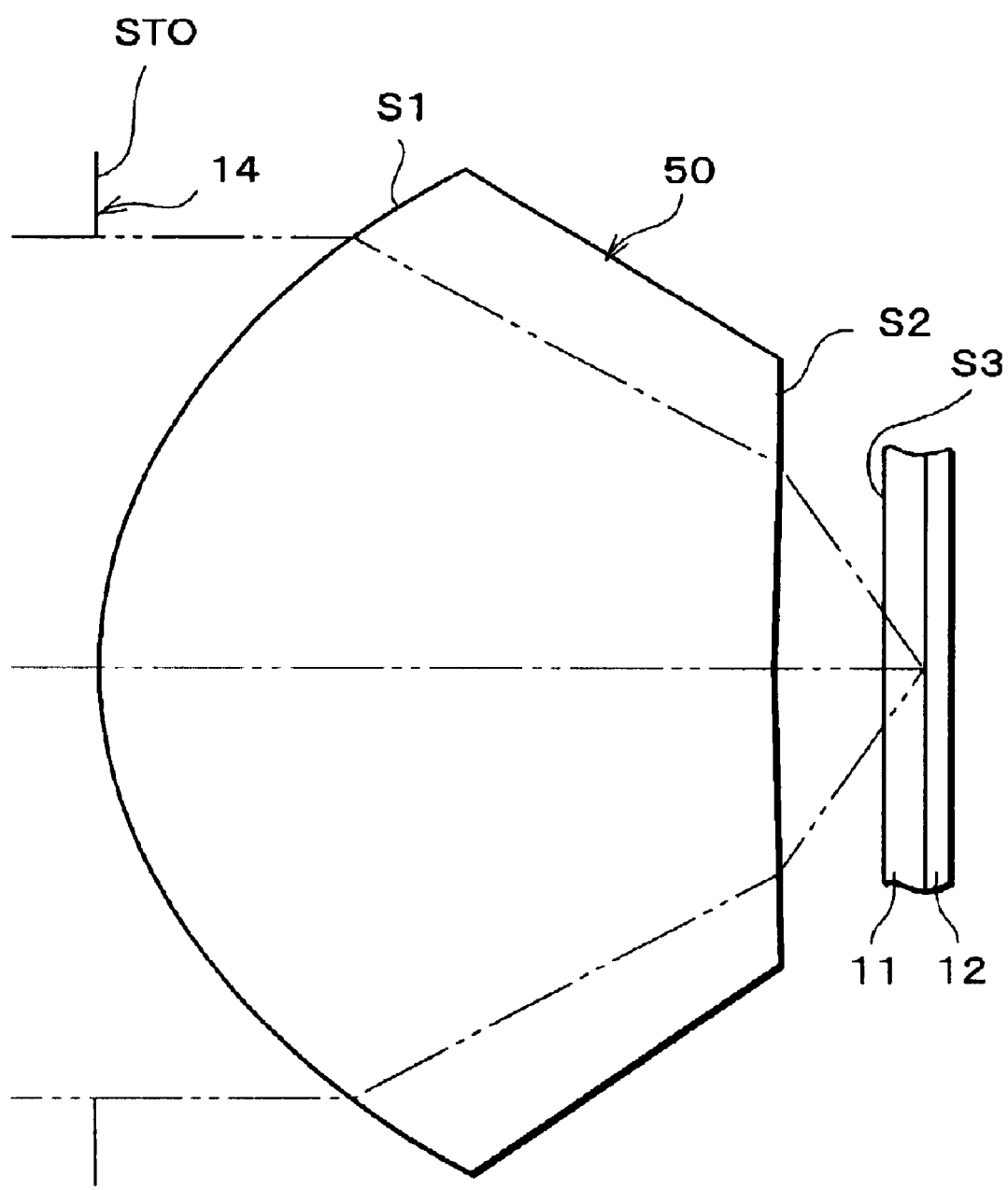
FIG. 27 is an explanatory view showing still another structure of the objective lens.
Figure 28:
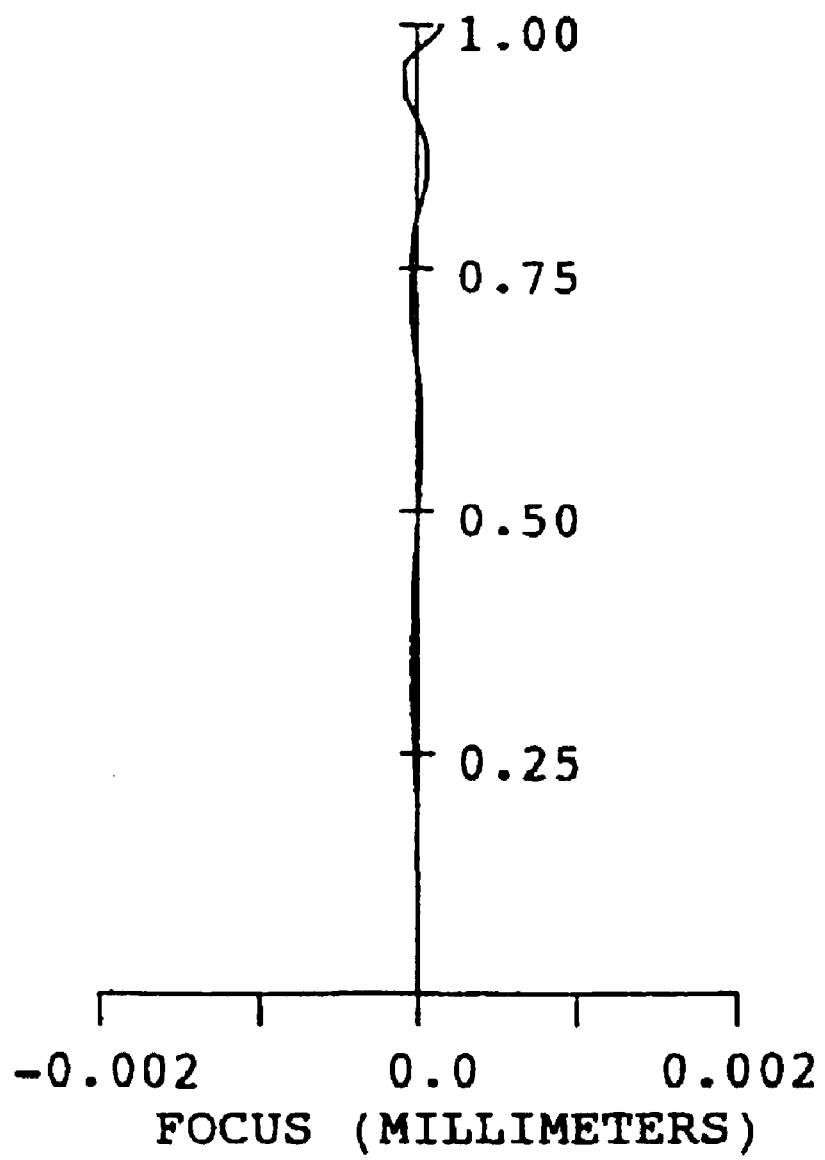
FIG. 28 is a graph showing a spherical aberration of the objective lens shown in FIG. 27.
Figure 29:
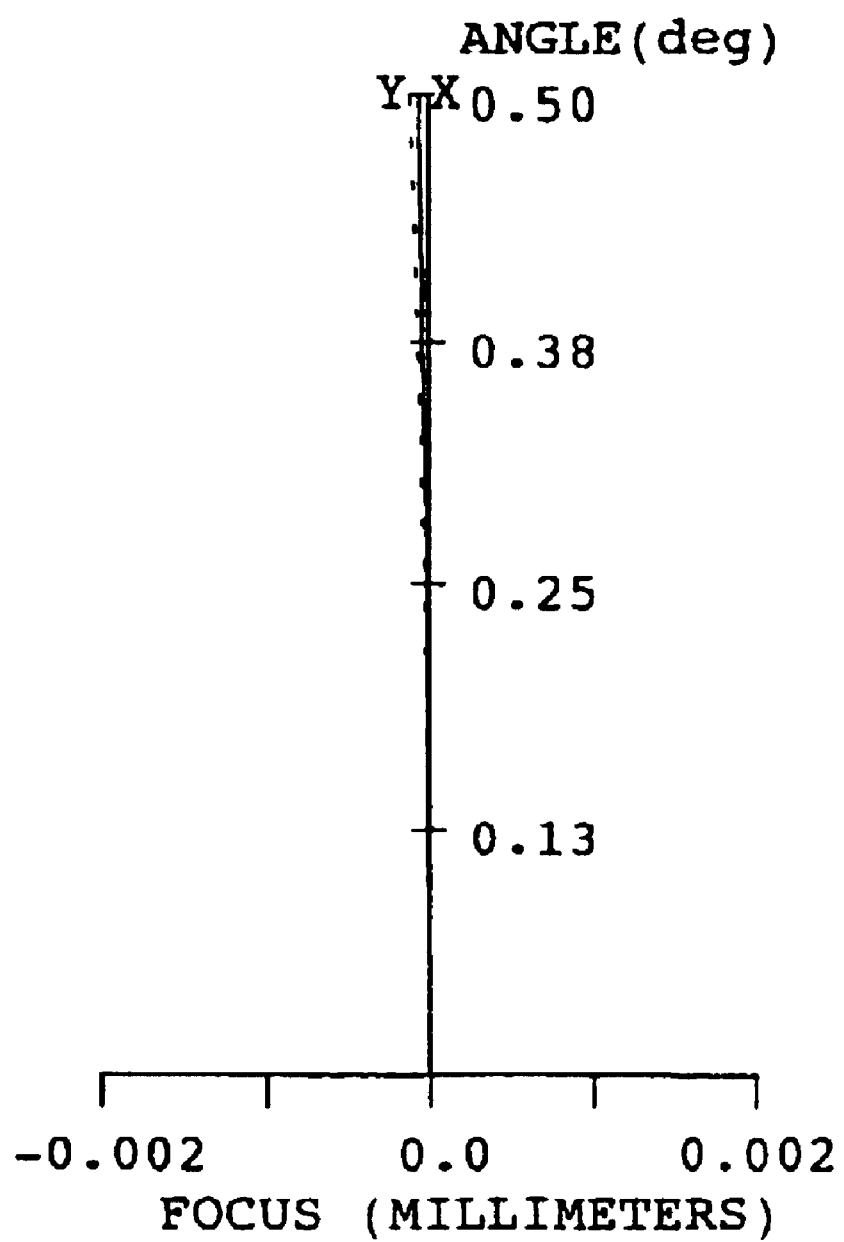
FIG. 29 is a graph showing an astigmatism of the objective lens shown in FIG. 27.

Here, FIG. 28 shows a spherical aberration, and FIG. 29 shows an astigmatism, when using the objective lens 50 shown in Table 5 and FIG. 27 as the objective lens.

As shown in FIG. 28, a spherical aberration can be restrained by using the objective lens 50. Besides, as shown in FIG. 29, an astigmatism can be restrained by using the objective lens 50.

FIGS. 30(a) and 30(b) are graphs showing lateral aberrations when an incident angle of a laser beam to the objective lens 50 is 0.5°. FIGS. 31(a) and 31(b) are graphs showing lateral aberrations when an incident angle of a laser beam to the objective lens 50 is 0°.

As shown in FIGS. 30(a) and 30(b) and FIGS. 31(a) and 31(b), by using the objective lens 50, aberrations in the X-axis direction and the Y-axis direction can be lessened, and a comatic aberration can also be restrained.

The objective lens may be structured as an objective lens 60 shown in the following Table 6 and FIG. 32. The conditions of the objective lens 60, except for the conditions shown in Table 6, such as the numerical aperture NA and the focal distance, are the same as those of the objective lens 6 shown in Table 1 and FIG. 3.

TABLE 5

| | SURFACE NO. | CURVATURE RADIUS (mm) | SURFACE INTERVAL (mm) | GLASS REFRACTIVE INDEX | GLASS ABBE NO. |
|---|---|---|---|---|---|
| DIAPHRAGM | STO | infinity | 0 | | |
| OBJECTIVE LENS | S1 | 1.48802 | 2.3 | 1.873823 | 37.2 |
| | | K: −0.632334 | | | |
| | | A: 0.967274E−02 B: 0.182565E−02 C: −0.369662E−03 | | | |
| | | D: 0.517717E−03 E: −0.237122E−03 | | | |
| | S2 | 12.2817 | 0.43 | | |
| | | K: 0.000000 | | | |
| | | A: 0.110812E+00 B: −0.457137E+00 C: 0.747675E+00 | | | |
| | | D: −0.608827E+00 E: 0.195929E+00 | | | |
| LIGHT-TRANSMISSIVE LAYER | S3 | infinity | 0.1 | 1.585 | 29.9 |
| | IMAGE | infinity | | | |

TABLE 6

| | SURFACE NO. | CURVATURE RADIUS (mm) | SURFACE INTERVAL (mm) | GLASS REFRACTIVE INDEX | GLASS ABBE NO. |
|---|---|---|---|---|---|
| DIAPHRAGM | STO | infinity | 0 | | |
| OBJECTIVE LENS | S1 | 1.56624 | 2 | 1.76781 | 49.3 |
| | | K: −0.521909 | | | |
| | | A: 0.673002E−02 B: −0.202369E−02 C: 0.311717E−02 | | | |
| | | D: −0.375929E−02 E: 0.204709E−02 F: −0.648953E−03 | | | |
| | | G: 0.272105E−04 H: 0.744195E−04 J: −0.207786E−04 | | | |
| | S2 | −34.98172 | 0.829 | | |
| | | K: 0.000000 | | | |
| | | A: 0.150690E+00 B: −0.391056E+00 C: 0.523649E+00 | | | |
| | | D: −0.354349E+00 D: 0.918448E−01 | | | |
| LIGHT-TRANSMISSIVE LAYER | S3 | infinity | 0.1 | 1.585 | 29.9 |
| | IMAGE | infinity | | | |

Figure 32:
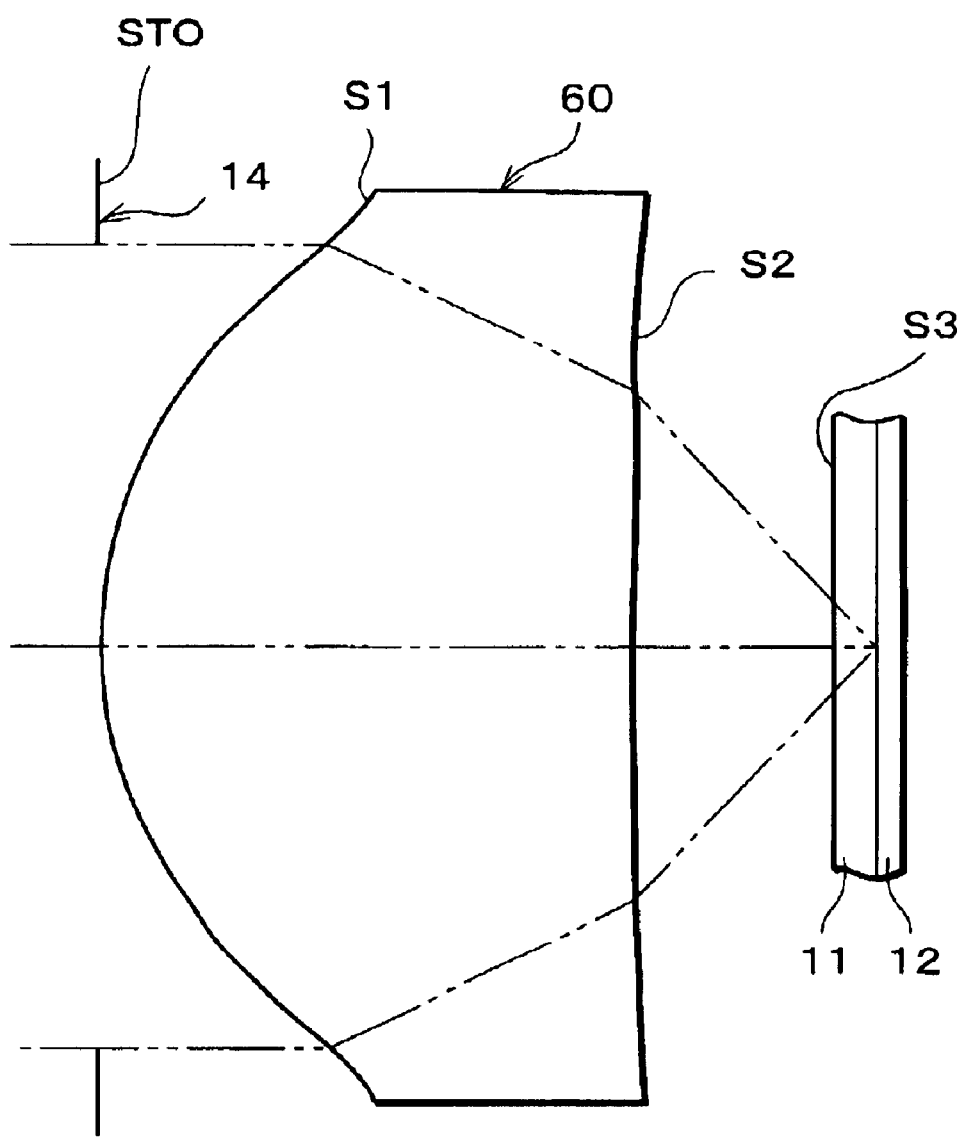
FIG. 32 is an explanatory view showing still another structure of the objective lens.
Figure 33:
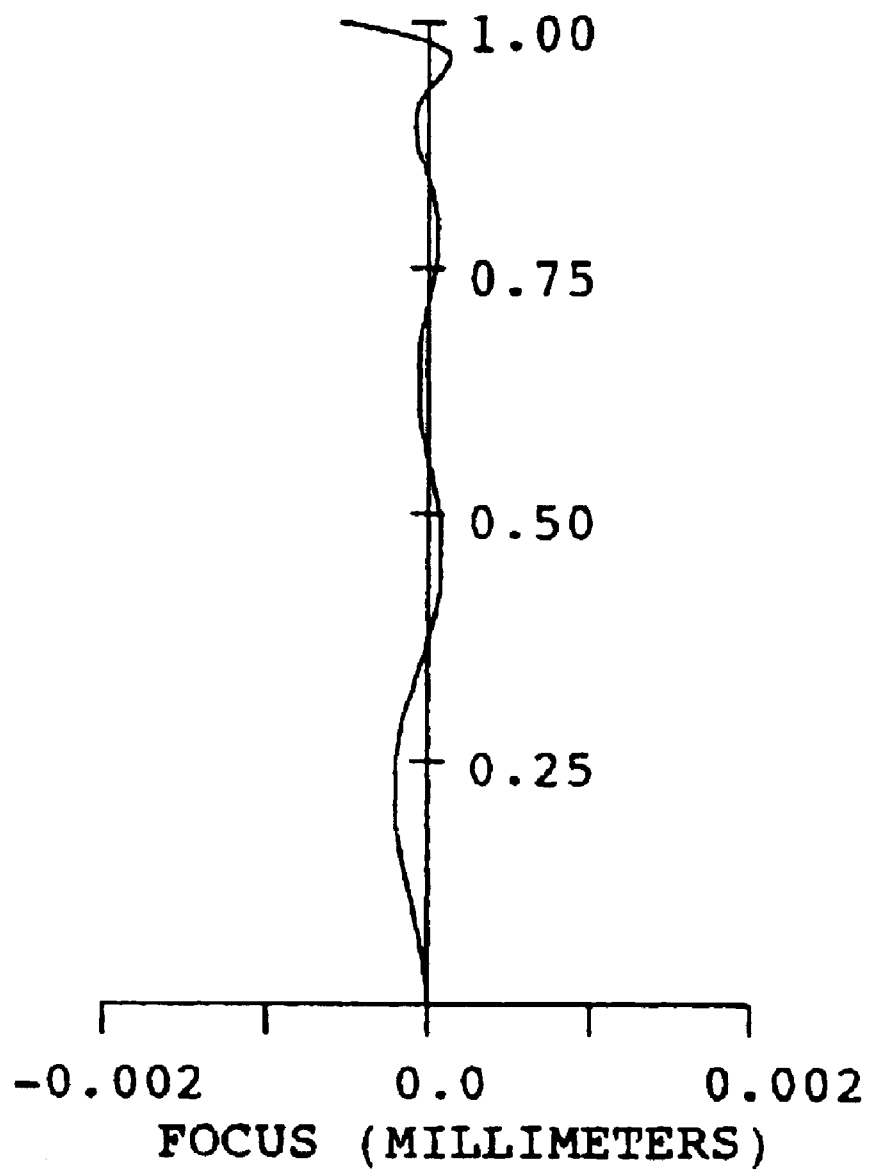
FIG. 33 is a graph showing a spherical aberration of the objective lens shown in FIG. 32.
Figure 34:
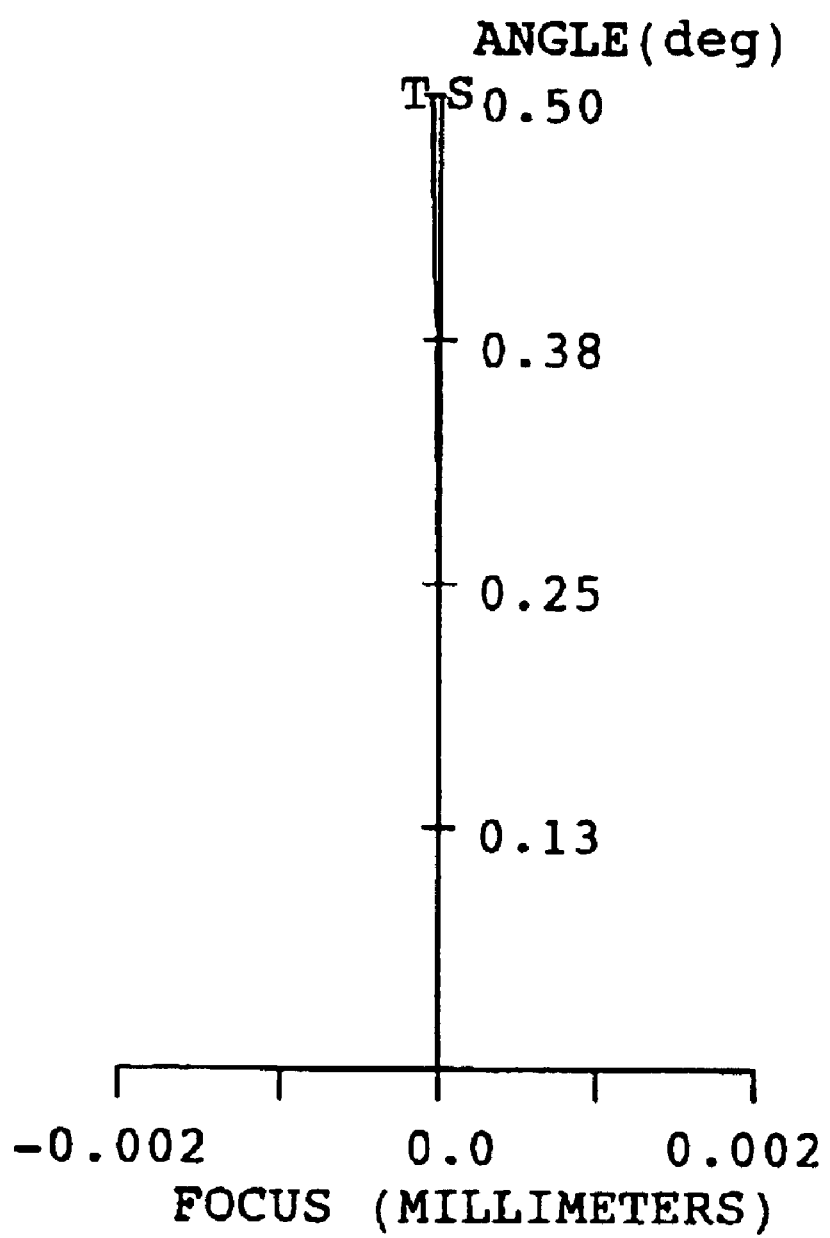
FIG. 34 is a graph showing an astigmatism of the objective lens shown in FIG. 32.
Figure 35:
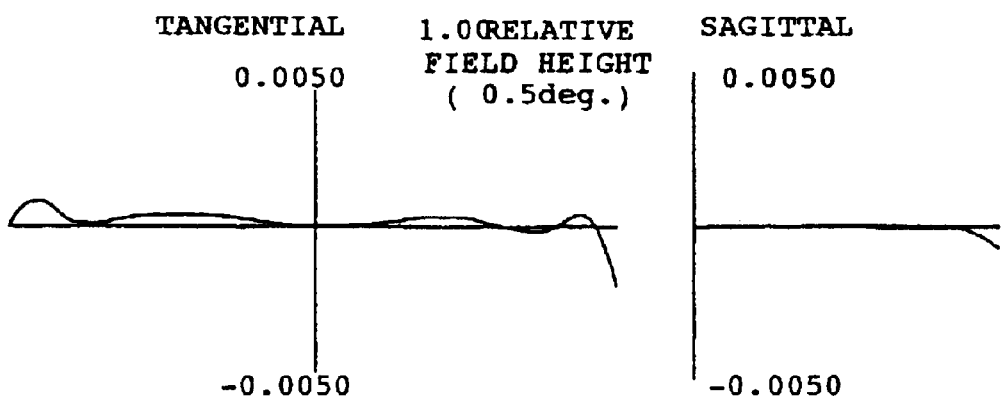
FIG. 35(a) is a graph showing a lateral aberration in a Y-axis direction when an incident angle of a laser beam to the objective lens shown in FIG. 32 is 0.5°.
FIG. 35(b) is a graph showing a lateral aberration in an X-axis direction when an incident angle of a laser beam to the objective lens shown in FIG. 32 is 0.5°.

Here, FIG. 33 shows a spherical aberration, and FIG. 34 shows an astigmatism, when using the objective lens 60 shown in Table 6 and FIG. 32 as the objective lens.

As shown in FIG. 33, a spherical aberration can be restrained by using the objective lens 60. Besides, as shown in FIG. 34, an astigmatism can be restrained by using the objective lens 60.

Figures 36, 36A:
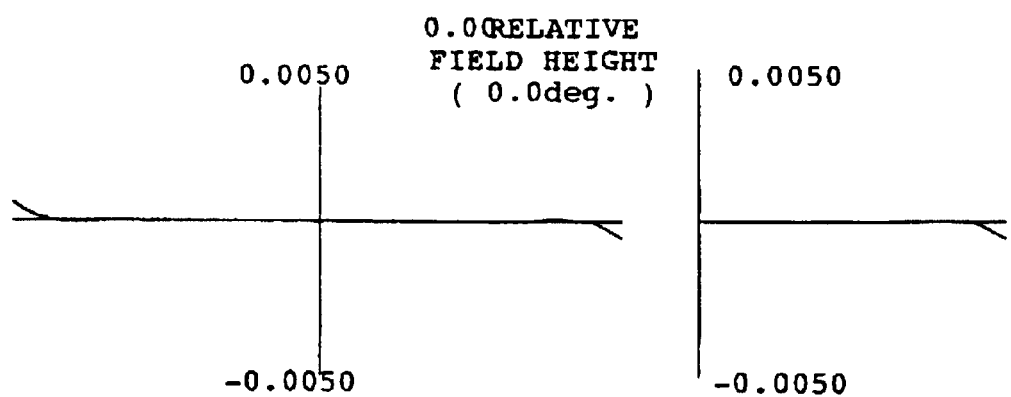
FIG. 36(a) is a graph showing a lateral aberration in a Y-axis direction when an incident angle of a laser beam to the objective lens shown in FIG. 32 is 0°.
Figure 37:
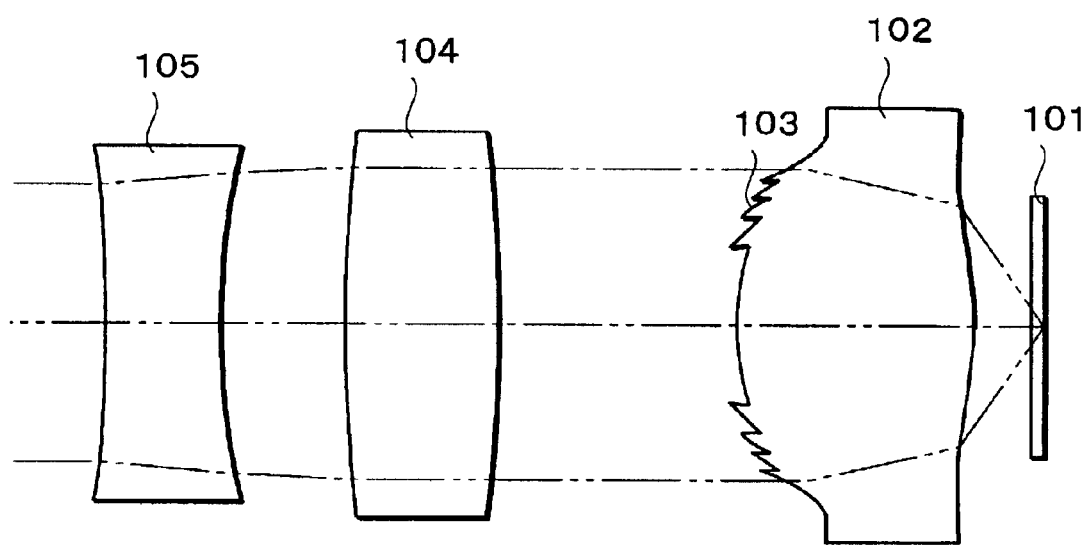
FIG. 37 is an explanatory view showing a structure of a main part of a conventional optical pick-up device.

FIGS. 35(a) and 35(b) are graphs showing lateral aberrations when an incident angle of a laser beam to the objective lens 60 is 0.5°. FIGS. 36(a) and 36(b) are graphs showing lateral aberrations when an incident angle of a laser beam to the objective lens 60 is 0°.

As shown in FIGS. 35(a) and 35(b) and FIGS. 36(a) and 36(b), by using the objective lens 60, aberrations in the X-axis direction and the Y-axis direction can be lessened, and a comatic aberration can also be restrained.

In this manner, each of the objective lenses 6, 20, 30, 40, 50, and 60 utilizes a single lens. Therefore, unlike a 2-group lens, the foregoing objective lens does not require a complicated lens adjustment, and has high reliability since it is formed without using resin, etc. In addition, since the foregoing objective lens is structured without a lens barrel, etc., a lightweight objective lens capable of high-speed recording and reproducing can be provided. Further, since a diffraction element is not required, high light utilizing efficiency, easy manufacturing, and miniaturization can be realized.

Besides, since the numerical aperture NA of the objective lenses 6, 20, 30, 40, 50, and 60 is not less than 0.75, a smaller beam spot can be obtained, realizing higher recording density in the disk 7.

Further, when a refractive index of the glass constituting the objective lenses 6, 20, 30, 40, 50, and 60 for at least one of used wavelengths is n, and the Abbe number for the d-line is v, n and v satisfy the following condition (7):

$$1.75 < n, \text{ and } 35 < v \tag{7}$$

A chromatic aberration is caused since the refractive index of the glass varies depending on the wavelength of light. Due to the chromatic aberration, the position or the size of an image differs depending on the wavelength.

However, by setting as $35 < v$, the chromatic aberration can be lessened, and such an arrangement can prevent the phenomenon that an image point is shifted and a beam spot is out of focus due to a slight change in the wavelength of the semiconductor laser 1.

Besides, by setting as $1.75 < n$, the curvature of the first surface S1 can be reduced, facilitating the manufacture of the objective lens.

As has been discussed, an objective lens of the present invention is an objective lens having a numerical aperture not less than 0.75, and the objective lens is characterized in that it is a single-lens objective lens both surfaces of which are aspherical, and is made of a material satisfying:

$$1.75 < n, \text{ and } 35 < v,$$

where n is a refractive index for at least one of used wavelengths, and v is an Abbe number for a d-line.

According to the foregoing structure, a single-lens objective lens is used as the objective lens, and, for example, a diffraction element, etc. are not required. Therefore, efficiency to utilize light (laser beam) passing through the objective lens can be improved. In addition, manufacture of the objective lens can be facilitated, and further, miniaturization of the objective lens can be realized.

Besides, since the numerical aperture NA of the objective lens is not less than 0.75, for example, it becomes possible to form a smaller beam spot incident on a recording medium, realizing higher recording density in the recording medium.

Generally, a chromatic aberration is caused since the refractive index of a material constituting the objective lens varies depending on the wavelength of light. Due to the chromatic aberration, the position or the size of an image differs depending on the wavelength.

However, by setting as $35 < v$, the chromatic aberration can be lessened, and such an arrangement can prevent the phenomenon that an image point is shifted and a beam spot is out of focus due to a slight change in the wavelength.

Besides, by setting as $1.75 < n$, the curvature of a first surface of the objective lens can be reduced, facilitating the manufacture of the objective lens.

It is preferable that the foregoing objective lens satisfies:

$$0.5 < f/f1 < 0.6,$$

where f is a focal distance of the objective lens, and f1 is a focal distance of the first surface of the objective lens.

Generally, in an objective lens, a spherical aberration is caused depending on the structure of the objective lens, such as the curvature at its aspherical surface apex, the shape, etc. Due to the spherical aberration, it becomes difficult to accurately condense the laser beam onto the recording medium.

However, according to the foregoing structure, by setting as $0.5 < f/f1$, the focal distance of the first surface can be shortened, that is, the curvature of the first surface can be increased. With this-structure, the refraction of the laser beam by a second surface may be small, and as a result the curvature of the second surface can be reduced. Consequently, a spherical aberration caused by the second surface can be lessened.

Besides, by setting as f/f1<0.6, the focal distance of the first surface can be increased, that is, the curvature of the first surface can be reduced. With this structure, a working distance WD can be increased.

It is preferable that the foregoing objective lens is a meniscus lens in which a surface on a side to which light is directed is convex.

According to the foregoing structure, a comatic aberration and a spherical aberration can be lessened.

It is preferable that the foregoing objective lens satisfies:

$0.8 < t/(NA \cdot D) < 1.0$, where NA is a numerical aperture of the objective lens, D is an effective diameter of the objective lens, and t is a thickness of a center of the objective lens.

According to the foregoing structure, by setting as $0.8 < t/(NA \cdot D)$, a satisfactory out-of-axis characteristic can be obtained.

By setting as $t/(NA \cdot D) < 1.0$, the volume and the weight of the objective lens can be reduced. This structure allows high speed drive of the objective lens in an optical pick-up device.

In addition, for example, when $t/(NA \cdot D)$ is not less than 1.0, and the objective lens is made of glass, a preform (a spherical glass material in a pre-molding stage) is required in large volume to manufacture the objective lens. Here, if a preform of an ordinary size is used, the curvature radius of the preform becomes greater than the curvature radius of the first surface of the objective lens, and thus space is formed between a central part of the first surface of a mold and the glass which becomes the objective lens. Since gas stays in the space, the formed objective lens tends to have shape failure.

However, by setting as $t/(NA \cdot D) < 1.0$, the objective lens can be manufactured without shape failure.

It is preferable that the foregoing objective lens is structured such that a difference between a distance between the both surfaces of the objective lens and a distance between the both surfaces when the both surfaces are spherical surfaces expressed by paraxial curvature radii respectively becomes thicker monotonously, with getting far from a surface apex of either of the both surfaces.

According to the foregoing structure, both of the first surface and the second surface of the objective lens are shaped such that the objective lens becomes thicker monotonously compared with a spherical surface expressed by a paraxial curvature radius, with getting far from the center, that is, the surface apex.

This arrangement can lessen a steep surface tilt of the objective lens due to high NA of the objective lens. Consequently, a mold for the objective lens can be easily manufactured, and a spherical aberration can be lessened.

It is preferable that the foregoing objective lens satisfies:

$60 \cdot NA < \theta$, where NA is a numerical aperture of the objective lens, and θ is an angle formed by a line tangent to the surface of the objective lens at a point to which light having the greatest incident height is directed within the effective diameter of the surface of the objective lens on the side to which light is directed, and a normal to an optical axis of the directed light.

Generally, in order to restrain a comatic aberration, it is necessary to increase the angle θ, or thicken the objective lens. An increase in the angle θ makes the curve of the objective lens steeper. With this arrangement, a comatic aberration can be restrained even when light is directed to the objective lens in a slanting direction.

Here, according to the foregoing structure, since the angle θ can be increased, a satisfactory out-of-axis characteristic can be obtained even in a thin objective lens.

It is preferable that the foregoing objective lens satisfies:

$D/(20 \cdot NA^5) < WD$, where NA is a numerical aperture of the objective lens, D is an effective diameter of the objective lens, and WD is a working distance of the objective lens.

According to the foregoing structure, the working distance WD can be increased. Therefore, the distance between the objective lens and the recording medium can be satisfactorily maintained, constituting a stable system.

An optical pick-up device of the present invention is structured so as to include a light source and the foregoing objective lens, and characterized in that information is recorded or reproduced on or from a recording medium by irradiating light emitted from the light source onto the recording medium using the objective lens.

The foregoing structure can provide an optical pick-up device which has less chromatic aberration and spherical aberration, and can accurately condense a laser beam onto the recording medium, without a decline in the efficiency to utilize the light (laser beam) passing through the objective lens.

It is preferable that the foregoing optical pick-up device is structured so as to include:

a collimator lens for collimating the light from the light source, provided between the light source and the objective lens; and correction means for correcting a spherical aberration by adjusting a distance between the collimator lens and the light source.

The foregoing structure can provide an optical pick-up device which has less chromatic aberration and spherical aberration, and can easily correct the aberrations.

A method for correcting a manufacturing error of an objective lens of the present invention is characterized in that a manufacturing error caused when manufacturing the objective lens used in the foregoing optical pick-up device is corrected by adjusting a tilt of the objective lens with respect to the optical pick-up device.

Generally, when manufacturing an objective lens, considering the accuracy for positioning a mold at the time of molding, the accuracies of the weight and the volume of the preform, which is a material for the objective lens, the accuracy of processing the mold, etc., manufacturing errors such as the tilts of both surfaces of the objective lens, and a deviation of the centers of the both surfaces of the objective lens are caused. A comatic aberration is caused due to such manufacturing errors.

However, according to the foregoing structure, the comatic aberration caused by the manufacturing errors can be corrected by adjusting the tilt of the objective lens with respect to the optical pick-up device. Consequently, the aberration can be lessened, and the aberration can be easily corrected.

A method for correcting a manufacturing error of an objective lens of the present invention is characterized in that a manufacturing error caused when manufacturing the objective lens used in the foregoing optical pick-up device is corrected by adjusting a tilt of the recording medium with respect to the optical pick-up device.

According to the foregoing structure, the comatic aberration caused by the manufacturing error can be corrected by adjusting the tilt of the recording medium with respect to the optical pick-up device. Consequently, the aberration can be lessened, and the aberration can be easily corrected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An objective lens having a numerical aperture not less than 0.75, wherein:
    the objective lens is a single-lens objective lens both surfaces of which are aspherical; and
    the objective lens satisfies:

$$0.5 < f/f1 < 0.6,$$

where f is a focal distance of the objective lens, and f1 is a focal distance of a first surface of the objective lens; and
    the objective lens is a meniscus lens in which a surface on a side to which light is directed is convex.

2. An optical pick-up device, comprising:
    a light source; and
    an objective lens having a numerical aperture not less than 0.75,
    wherein the objective lens is a single-lens objective lens both surfaces of which are aspherical, and
    the objective lens satisfies:

$$0.5 < f/f1 < 0.6,$$

where f is a focal distance of the objective lens, and f1 is a focal distance of a first surface of the objective lens, and
    the objective lens is a meniscus lens in which a surface on a side to which light is directed is convex, and
    wherein information is recorded or reproduced on or from a recording medium by irradiating light emitted from the light source onto the recording medium using the objective lens.

3. An objective lens having a numerical aperture not less than 0.75, wherein:
    the objective lens is a single-lens objective lens both surfaces of which are aspherical;
    the objective lens satisfies:

$$0.5 < f/f1 < 0.6,$$

where f is a focal distance of the objective lens, and f1 is a focal distance of a first surface of the objective lens; and
    the objective lens satisfies:

$$0.8 < t/(NA \cdot D) < 1.0,$$

where NA is a numerical aperture of the objective lens, D is an effective diameter of the objective lens, and t is a thickness of a center of the objective lens.

4. An objective lens having a numerical aperture not less than 0.75, wherein:
    the objective lens is a single-lens objective lens both surfaces of which are aspherical;
    the objective lens satisfies:

$$0.5 < f/f1 < 0.6,$$

where f is a focal distance of the objective lens, and f1 is a focal distance of a first surface of the objective lens; and
    a difference between a distance between the both surfaces of the objective lens and a distance between the both surfaces when the both surfaces are spherical surfaces expressed by paraxial curvature radii respectively becomes thicker monotonously, with getting far from a surface apex of either of the both surfaces.

5. An objective lens having a numerical aperture not less than 0.75, wherein:
    the objective lens is a single-lens objective lens both surfaces of which are aspherical;
    the objective lens satisfies:

$$0.5 < f/f1 < 0.6,$$

where f is a focal distance of the objective lens, and f1 id a focal distance of a first surface of the objective lens; and
    the objective lens satisfies;

$$60 \cdot NA < \theta,$$

where NA is a numerical aperture of the objective lens and θ is an angle formed by a line tangent to the surface of the objective lens at a point to which light having the greatest incident height is directed within an effective diameter of the surface of the objective lens on a side to which light is directed, and a normal to an optical axis of the directed light.

6. An objective lens having a numerical aperture not less than 0.75, wherein:
    the objective lens is a single-lens objective lens both surfaces of which are aspherical;
    the objective lens satisfies;

$$0.5 f/f1 < 0.6,$$

where f is a focal distance of the objective lens, and f1 is a focal distance of a first surface of the objective lens; and
    the objective lens satisfies;

$$D/(20 \cdot NA^5) < WD,$$

where NA is a numerical aperture of the objective lens, D is an effective diameter of the objective lens, and WD is a working distance of the objective lens.

7. An optical pick-up device, comprising:
    a light source; and
    an objective lens having a numerical aperture not less than 0.75,
    wherein the objective lens is a single-lens objective lens both surfaces of which are aspherical,
    the objective lens satisfies;

$$0.5 < f/f1 < 0.6,$$

where f is a focal distance of the objective lens, and f1 is a focal distance of a first surface of the objective lens, and
    the objective lens satisfies;

$$0.8 < t/(NA \cdot D) < 1.0,$$

where NA is a numerical aperture of the objective lens, D is an effective diameter of the objective lens, and t is a thickness of a center of the objective lens, and wherein information is recorded or reproduced on or from a recording medium by irradiating light emitted from the light source onto the recording medium using the objective lens.

8. An optical pick-up device, comprising:

a light source; and an objective lens having a numerical aperture not less than 0.75, wherein the objective lens is a single-lens objective lens both surfaces of which are aspherical, the objective lens satisfies:

$$0.5 < f/f < 0.6,$$

where f is a focal distance of the objective lens, and f1 is a focal distance of a first surface of the objective lens, and a difference between a distance between the both surfaces of the objective lens and a distance between the both surfaces when the both surfaces are spherical surfaces expressed by paraxial curvature radii respectively becomes thicker monotonously, with getting far from a surface apex of either of the both surfaces, and wherein information is recorded or reproduced on or from a recording medium by irradiating light emitted from the light source onto the recording medium using the objective lens.

9. An optical pick-up device, comprising:

a light source; and an objective lens having a numerical aperture not less than 0.75, wherein the objective lens is a single-lens objective lens both surfaces of which are aspherical, the objective lens satisfies:

$$0.5 < f/f1 < 0.6,$$

where f is a focal distance of the objective lens, and f1 is a focal distance of a first surface of the objective lens, and the objective lens satisfies:

$$60 \cdot NA < \theta,$$

wherein NA is a numerical aperture of the objective lens, and θ is an angle formed by a line tangent to the surface of the objective lens at a point to which light having the greatest incident height is directed within an effective diameter of the surface of the objective lens on a side to which light is directed, and a normal to an optical axis of the directed light, and wherein information is recorded or reproduced on or from a recording medium by irradiating light emitted from the light source onto the recording medium using the objective lens.

10. An optical pick-up device, comprising:

a light source; and an objective lens having a numerical aperture not less than 0.75, wherein the objective lens is a single-lens objective lens both surfaces of which are aspherical, the objective lens satisfies:

$$0.5 < f/f1 < 0.6,$$

where f is a focal distance of the objective lens, and f1 is a focal distance of a first surface of the objective lens, and the objective lens satisfies:

$$D/(20 \cdot NA^5) < WD,$$

where NA is a numerical aperture of the objective lens, D is an effective diameter of the objective lens, and WD is a working distance of the objective lens, and wherein information is recorded or reproduced on or from a recording medium by irradiating light emitted from the light source onto the recording medium using the objective lens.

11. A method for correcting a manufacturing error of an objective lens, wherein:

a manufacturing error caused when manufacturing an objective lens having a numerical aperture not less than 0.75 is corrected by adjusting a tilt of the objective lens with respect to an optical pickup device, the optical pick-up device comprising a light source and the objective lens, for recording or reproducing information on or from a recording medium by irradiating light emitted from the light source onto the recording medium using the objective lens, the objective lens being a single-lens objective lens both surfaces of which are aspherical, the objective lens satisfying:

$$0.5 < f/f1 < 0.6,$$

where f is a focal distance of the objective lens, and f1 is a focal distance of a first surface of the objective lens, the objective lens being a meniscus lens in which a surface on a side to which light is directed is convex.

12. The method for correcting a manufacturing error of an objective lens as set forth in claim 11, wherein the objective lens satisfies:

$$0.8 < t/(NA \cdot D) < 1.0,$$

where NA is a numerical aperture of the objective lens, D is an effective diameter of the objective lens, and t is a thickness of a center of the objective lens.

13. The method for correcting a manufacturing error of an objective lens as set forth in claim 11, wherein:

a difference between a distance between the both surfaces of the objective lens and a distance between the both surfaces when the both surfaces are spherical surfaces expressed by paraxial curvature radii respectively becomes thicker monotonously, with getting far from a surface apex of either of the both surfaces.

14. The method for correcting a manufacturing error of an objective lens as set forth in claim 11, wherein the objective lens satisfies:

$$60 \cdot NA < \theta,$$

where NA is a numerical aperture of the objective lens, and θ is an angle formed by a line tangent to the surface of the objective lens at a point to which light having the greatest incident height is directed within an effective diameter of the surface of the objective lens on a side to which light is directed, and a normal to an optical axis of the directed light.

15. The method for correcting a manufacturing error of an objective lens as set forth in claim 11, wherein the objective lens satisfies:

$$D/(20 \cdot NA^5) < WD,$$

where NA is a numerical aperture of the objective lens, D is an effective diameter of the objective lens, and WD is a working distance of the objective lens.

16. The method for correcting a manufacturing error of an objective lens as set forth in claim 11,
wherein the optical pick-up device includes:
a collimator lens for collimating the light from the light source, provided between the light source and the objective lens; and
correction means for correcting a spherical aberration by adjusting a distance between the collimator lens and the light source.

17. The method for correcting a manufacturing error of an objective lens as set forth in claim 11, wherein:
the tilt of the objective lens with respect to the optical pick-up device is adjusted when mounting the objective lens on the optical pick-up device.

18. A method for correcting a manufacturing error of an objective lens, wherein:
a manufacturing error caused when manufacturing an objective lens having a numerical aperture not less than 0.75 is corrected by adjusting a tilt of a recording medium with respect to an optical pickup device,
the optical pick-up device comprising a light source and the objective lens, for recording or reproducing information on or from a recording medium by irradiating light emitted from the light source onto the recording medium using the objective lens
the objective lens being a single-lens objective lens both surfaces of which are aspherical,
the objective lens satisfying:

$$0.5 < f/f1 < 0.6,$$

where f is a focal distance of the objective lens, and f1 is a focal distance of a first surface of the objective lens,
the objective lens being a meniscus lens in which a surface on a side to which light is directed is convex.

19. The method for correcting a manufacturing error of an objective lens as set forth in claim 18, wherein the objective lens satisfies:

$$0.8 < t/(NA \cdot D) < 1.0,$$

where NA is a numerical aperture of the objective lens, D is an effective diameter of the objective lens, and t is a thickness of a center of the objective lens.

20. The method for correcting a manufacturing error of an objective lens as set forth in claim 18, wherein:
a difference between a distance between the both surfaces of the objective lens and a distance between the both surfaces when the both surfaces are spherical surfaces expressed by paraxial curvature radii respectively becomes thicker monotonously, with getting far from a surface apex of either of the both surfaces.

21. The method for correcting a manufacturing error of an objective lens as set forth in claim 18, wherein the objective lens satisfies:

$$60 \cdot NA < 0,$$

where NA is a numerical aperture of the objective lens, and 8 is an angle formed by a line tangent to the surface of the objective lens at a point to which light having the greatest incident height is directed within an effective diameter of the surface of the objective lens on a side to which light is directed, and a normal to an optical axis of the directed light.

22. The method for correcting a manufacturing error of an objective lens as set forth in claim 18, wherein the objective lens satisfies:

$$D/(20 \cdot NA^5) < WD,$$

where NA is a numerical aperture of the objective lens, D is an effective diameter of the objective lens, and WD is a working distance of the objective lens.

23. The method for correcting a manufacturing error of an objective lens as set forth in claim 18,
wherein the optical pick-up device, includes:
a collimator lens for collimating the light from the light source, provided between the light source and the objective lens; and
correction means for correcting a spherical aberration by adjusting a distance between the collimator lens and the light source.

24. The method for correcting a manufacturing error of an objective lens as set forth in claim 18, wherein:
the tilt of the recording medium with respect to the optical pick-up device is adjusted when mounting the objective lens on the optical pick-up device.

* * * * *